US009729487B2

(12) United States Patent
Sato

(10) Patent No.: US 9,729,487 B2
(45) Date of Patent: Aug. 8, 2017

(54) SYSTEM, INFORMATION PROCESSING APPARATUS, METHOD OF CONTROLLING THE SAME, AND NON-TRANSITORY COMPUTER-READABLE MEDIUM, THAT MANAGE A PROCESSING FLOW INCLUDING A PLURALITY OF TASKS

(71) Applicant: CANON KABUSHIKI KAISHA, Tokyo (JP)

(72) Inventor: Tetsuya Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 514 days.

(21) Appl. No.: 14/147,641

(22) Filed: Jan. 6, 2014

(65) Prior Publication Data
US 2014/0195623 A1     Jul. 10, 2014

(30) Foreign Application Priority Data

Jan. 8, 2013  (JP) .................................. 2013-001292

(51) Int. Cl.
*G06F 15/16* (2006.01)
*H04L 12/58* (2006.01)

(52) U.S. Cl.
CPC .............. *H04L 51/22* (2013.01); *H04L 51/08* (2013.01)

(58) Field of Classification Search
CPC ................................ H04L 51/22; H04L 51/08
USPC .................. 709/206, 203, 204, 205
See application file for complete search history.

(56) References Cited

U.S. PATENT DOCUMENTS

| 2002/0143883 | A1* | 10/2002 | Miyake | ................... | H04L 12/58 709/206 |
| 2003/0099361 | A1* | 5/2003 | Uchida | ................... | H04L 63/04 380/277 |
| 2003/0135554 | A1* | 7/2003 | Bellotti | ................ | G06Q 10/107 709/206 |
| 2008/0250479 | A1* | 10/2008 | Matoba | ................ | G06F 3/1204 726/5 |
| 2011/0057884 | A1* | 3/2011 | Gormish | ................... | G06F 9/54 345/173 |

(Continued)

FOREIGN PATENT DOCUMENTS

JP          2011-060287 A       3/2011

*Primary Examiner* — Liangche A Wang
*Assistant Examiner* — Kaylee Huang
(74) *Attorney, Agent, or Firm* — Rossi, Kimms & McDowell LLP

(57) ABSTRACT

An information processing apparatus that manages a processing flow including a plurality of tasks and is connected to an image processing apparatus and a user terminal, the information processing apparatus comprises: an issuing unit which, if the processing flow requested from the image processing apparatus includes a mail-transmission task of transmitting an e-mail with an attached document from the image processing apparatus to the user terminal, issues a mail address in association with the requested processing flow, wherein the attached document is document data to be processed in the processing flow; a setting unit which sets, as a "Reply-To" setting of the e-mail, the issued mail address into the mail-transmission task included in the requested processing flow; and a first transmission unit which transmits the processing flow set by the setting unit to the image processing apparatus.

11 Claims, 17 Drawing Sheets

(56) References Cited

U.S. PATENT DOCUMENTS

| | | | |
|---|---|---|---|
| 2012/0154842 A1* | 6/2012 | Hori | G06F 3/1205 358/1.13 |
| 2013/0070297 A1* | 3/2013 | Kato | H04N 1/00217 358/1.15 |
| 2014/0022572 A1* | 1/2014 | Washington | G06F 17/30265 358/1.13 |

* cited by examiner

FIG. 5A

| PROCESSING FLOW ID 501 | PROCESSING FLOW NAME 502 | DISCLOSURE DESTINATION 503 | PROCESSING FLOW DEFINITION 504 |
|---|---|---|---|
| 75301938 | FORM DATA TRANSMISSION | tsato | 23153.xml |
| 63010219 | BOARD WRITING TRANSMISSION | ookubo | 91234.xml |
| ... | ... | ... | ... |

| MAIL ADDRESS 551 | PROCESSING FLOW ID 552 | PROCESSING FLOW REQUEST DATE/TIME 553 | AVAILABILITY 554 |
|---|---|---|---|
| dha9apcgap1hv@flowservice.bcd.com | 75301938 | 2012/05/31 13:12:31 | true |
| adn84hgc0aice@flowservice.bcd.com | 63010219 | 2012/05/18 15:12:11 | true |
| ... | ... | ... | ... |

550

FIG. 6 http://www.flowServicexxxxx.co.jp/...

600 — CREATE PROCESSING FLOW

601 — PROCESSING FLOW NAME: [            ]

602
SCANNING:
- DOCUMENT SIZE: AUTO
- COLOR MODE: FULL COLOR
- RESOLUTION: 600x600dpi
- SCALE: 100%

603 — ☑ USER PERFORMS DOCUMENT EDITING
604 — E-MAIL ADDRESS: [            ]
605 — ☐ SET E-MAIL ADDRESS WHEN PROCESSING FLOW IS EXECUTED
606 — FILE FORMAT: PDF
607 — ☐ CHECK ELECTRONIC SIGNATURE

608
☑ PERFORM IMAGE PROCESSING
⋮

609
TRANSMIT TO DOCUMENT MANAGEMENT SERVER
⋮

[ OK ]  [ CANCEL ]
 610      611

FIG. 7

```
700 ─ <?xml version="1.0" encoding="UTF-8"?>
701 ─ <JobScript name="FORM DATA TRANSMISSION" user="tsato" id="75301938">
705 ─   <Scan>         702                        703        704
          <Settings>
            <DocumentSize>AUTO</DocumentSize>
            <ColorMode>FullColor</ColorMode>
            <Resolution>600x600</Resolution>
            <CopyRatio>100</CopyRatio>
          </Settings>
        </Scan>
706 ─   <Send>
          <Settings>
707 ─       <EmailAddress>user_tsato@abc.co.jp</EmailAddress>
708 ─       <SettingMFP>true</SettingMFP>
709 ─       <FileFormat>PDF</FileFormat>
710 ─       <Signature>true</Signature>
          </Settings>
        </Send>
711 ─   <Imaging path="/convert/PDF">
          . . .
        </Imaging>
712 ─   <Connector>
          <Settings>
            <Name>http://www.DocumentService/...</Name>
            <path>/user01</path>
            <FileName>CONSULTATION DOCUMENT</FileName>
            <User>tsato</User>
            <Password>xxxxxx</Password>
          </Settings>
        </Connector>
        </JobScript>
```

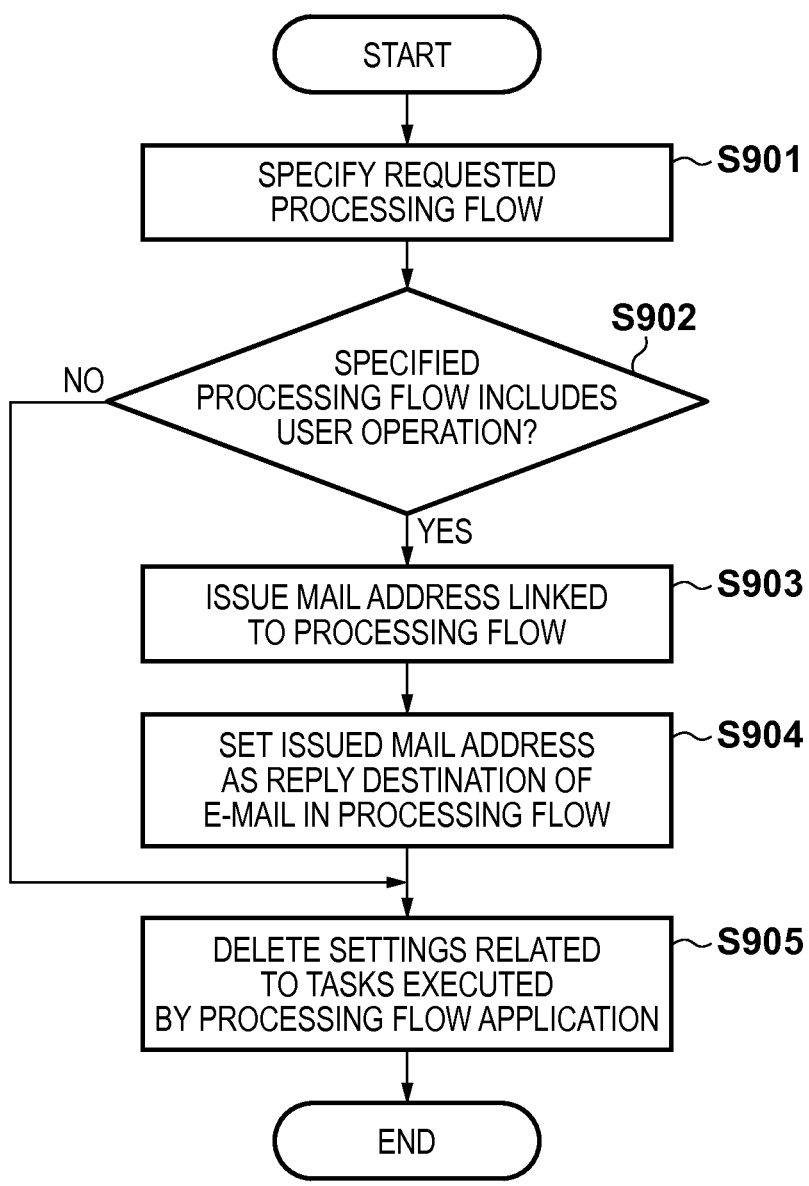

FIG. 10

```
<?xml version="1.0" encoding="UTF-8"?>
<JobScript name="FORM DATA TRANSMISSION" user="tsato" id="75301938">
 <Scan>
  . . .
 </Scan>
 <Send>
   <Settings>
     <EmailAddress>user_tsato@abc.co.jp</EmailAddress>
     <ReplyTo>dha9apcgap1hv@flowservice.bcd.com</ReplyTo>
     <SettingMFP>true</SettingMFP>
     <FileFormat>PDF</FileFormat>
     <Signature>true</Signature>
   </Settings>
 </Send>
</JobScript>
```

1001 → `<ReplyTo>dha9apcgap1hv@flowservice.bcd.com</ReplyTo>`

1002 → `</JobScript>`

FIG. 13

```
1300
<?xml version="1.0" encoding="UTF-8"?>
<JobScript name="FORM DATA TRANSMISSION" user="tsato" id="75301938">
 <Scan>
   <Settings>
     <DocumentSize>AUTO</DocumentSize>
     <ColorMode>FullColor</ColorMode>
     <Resolution>600x600</Resolution>
     <CopyRatio>100</CopyRatio>
   </Settings>
 </Scan>
 <Send>
   <Settings>
     <EmailAddress>user_tsato@abc.co.jp</EmailAddress>
1301 <ReplyTo>flowservice@flowservice.bcd.com<ReplyTo>
     <SettingMFP>true</SettingMFP>
     <FileFormat>PDF</FileFormat>
     <Signature>true</Signature>
   </Settings>
 </Send>
 <Imaging path="/convert/PDF">
   . . .
 </Imaging>
 <Connector>
   <Settings>
     <Name>http://www.DocumentService/...</Name>
     <path>/user01</path>
     <FileName>CONSULTATION DOCUMENT</FileName>
     <User>tsato</User>
     <Password>xxxxxx</Password>
   </Settings>
 </Connector>
</JobScript>
```

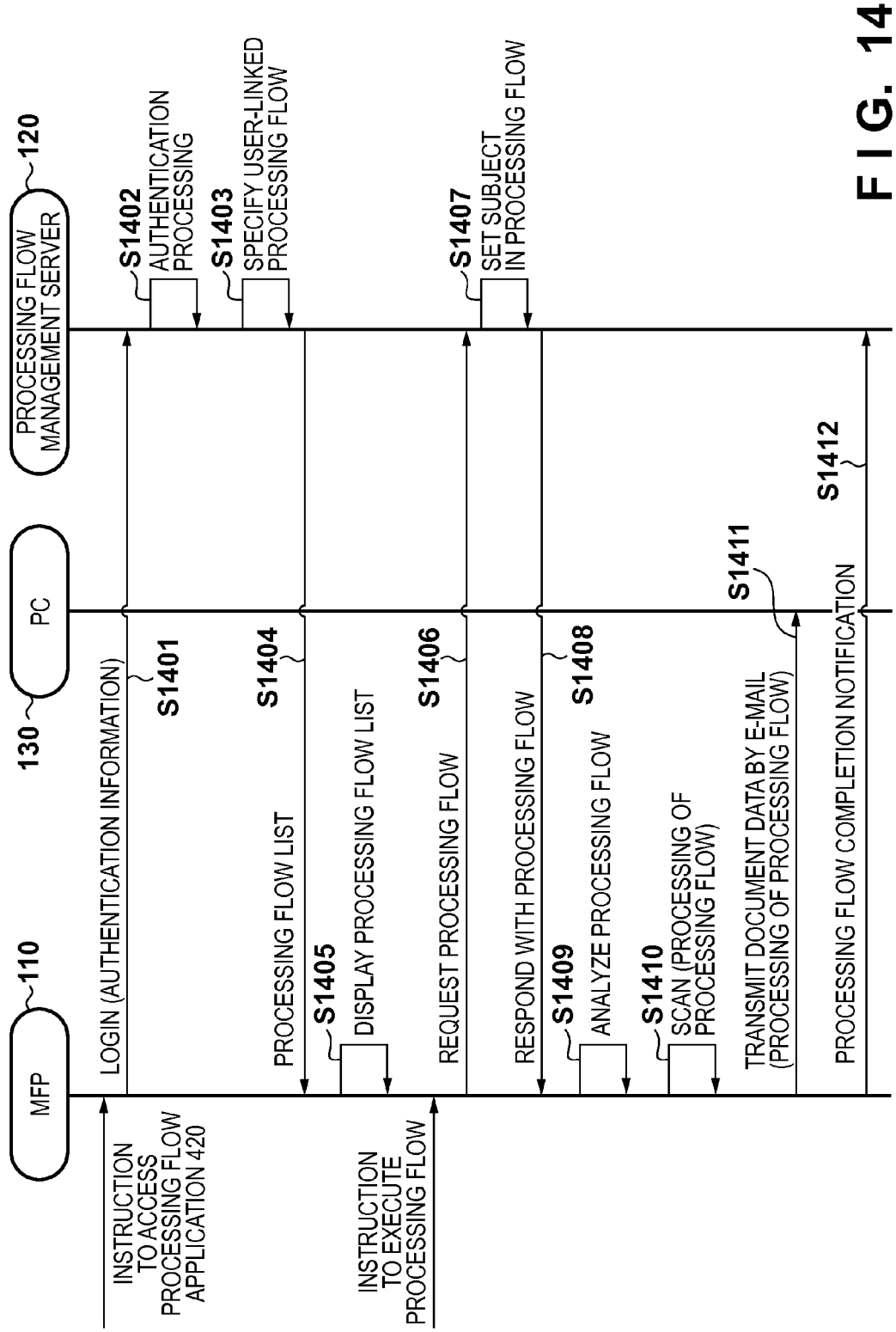

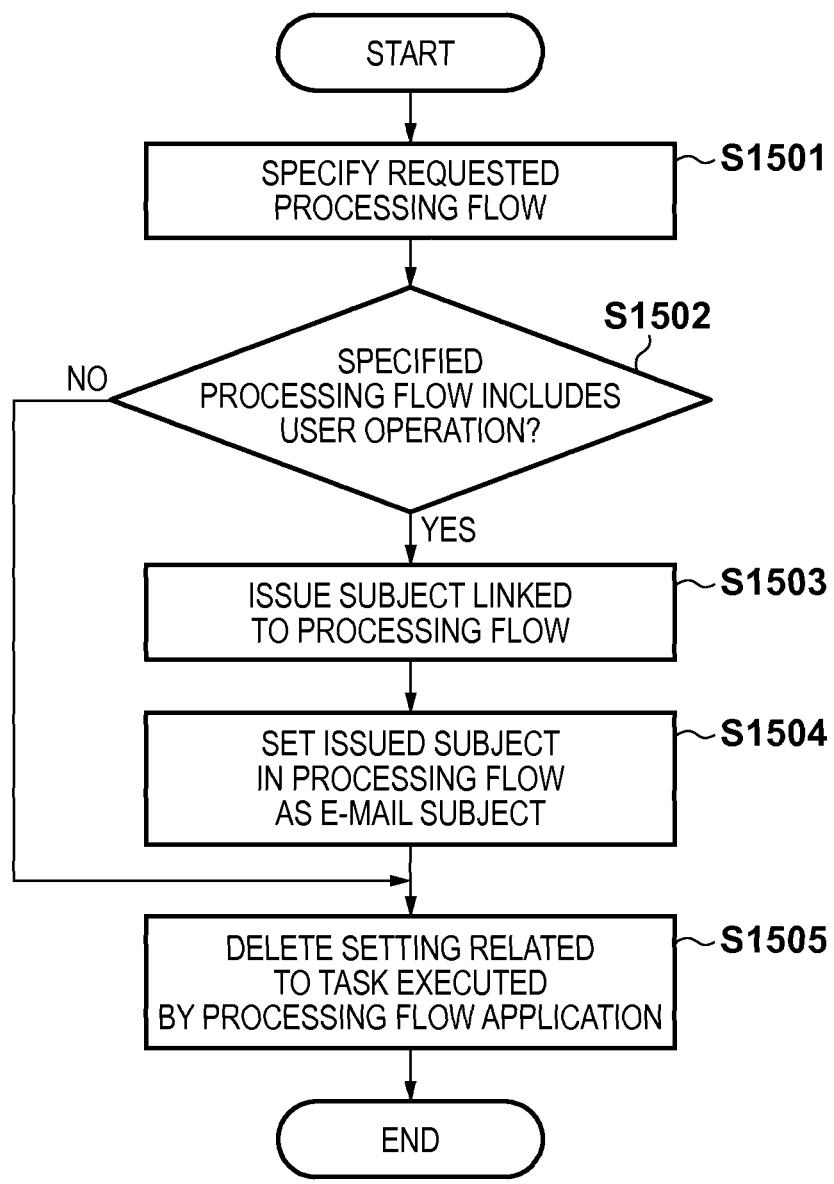

FIG. 16

```xml
<?xml version="1.0" encoding="UTF-8"?>
<JobScript name="FORM DATA TRANSMISSION" user="tsato" id="75301938">
 <Scan>
  . . .
 </Scan>
 <Send>
   <Settings>
     <EmailAddress>user_tsato@abc.co.jp</EmailAddress>
     <Subject>dha9apcgap1hv</Subject>                    ← 1601
     <ReplyTo>flowservice@flowservice.bcd.com</ReplyTo>
     <SettingMFP>true</SettingMFP>
     <FileFormat>PDF</FileFormat>
     <Signature>true</Signature>
   </Settings>
 </Send>
</JobScript>
```

SYSTEM, INFORMATION PROCESSING APPARATUS, METHOD OF CONTROLLING THE SAME, AND NON-TRANSITORY COMPUTER-READABLE MEDIUM, THAT MANAGE A PROCESSING FLOW INCLUDING A PLURALITY OF TASKS

BACKGROUND OF THE INVENTION

Field of the Invention

The present invention relates to a system that handles a processing flow, an information processing apparatus, a method for controlling the same, and a non-transitory computer-readable medium.

Description of the Related Art

Conventionally, there are systems where multiple tasks, which are processes that can be executed on document data, are defined in advance as a flow of a series of combined processes, and the definition is called by a user instruction and executed. Tasks performed by an image processing apparatus such as an MFP (Multi Function Peripheral) include scanning of originals, document data printing and transmission (e.g., e-mail, fax, file transfer), and the like. For example, it is possible to define a task that is to be executed by apparatuses, such as a task of transmitting document data that was scanned by the MFP to a PC and subjecting it to image processing such as format conversion or the like on the PC, and subsequently registering the converted document data in a document management system. A work flow can be realized by connecting tasks to be processed by apparatuses. In the present specification, "processing flow" is defined as a flow of a series of processing comprised of multiple tasks combined in this way.

In a system that handles processing flows, by merely pressing a button displayed on a UI of the MFP for example, all of the processing desired by a user is thereafter executed automatically and the user can register document data in the intended document management system.

On the other hand, there are use cases where rather than performing all of the processing automatically, the user wishes to perform a task with respect to the document data during the processing flow. For example, this happens when, after authenticating and correcting OCR (Optical Character Recognition) results for document data that has been scanned and has undergone OCR processing, the user registers the document data in a document management system. In such cases, there is a problem in that a user operation is included during processing or communication between apparatuses included in the system and as a result, the user operation is cumbersome.

Additionally, there are techniques of realizing the coordination of tasks between users using e-mail (e.g. Japanese Patent Laid-Open No. 2011-060287). According to Japanese Patent Laid-Open No. 2011-060287, an e-mail address of a person performing a task in the step after the next is set as "Reply-To" in an e-mail, and the e-mail is transmitted to a person performing a task in the next step. By merely performing an e-mail response instruction, the person performing the next step can create an e-mail addressed to the person performing the step after the next who is set as "Reply-To" in the e-mail, and thus it is possible to move the procedure (task) to the person performing the step after the next.

However, although it will be possible to transmit an e-mail to the person performing the step after the next with the above-mentioned prior technology, the person (or apparatus) who receives that e-mail will not know what to do in the step after the next. Because of this, in a system that handles processing flows, even if a server that centrally manages a processing flow receives document data, it will not be possible to continue subsequent processing. Accordingly, the user needs to not only transmit the e-mail, but also specify the processing flow that the server is to execute when the e-mail is to be transmitted.

SUMMARY OF THE INVENTION

In view of the above-mentioned problem, the present invention in one aspect provides a system in which a user operation is easily performed, even in a processing flow that requires a user operation part of the way through the flow.

According to one aspect of the present invention, there is provided a system including an information processing apparatus that manages a processing flow including a plurality of tasks, an image processing apparatus that executes at least one of the tasks included in the processing flow, and a user terminal, wherein the information processing apparatus comprises: an issuing unit configured to, if the processing flow requested from the image processing apparatus includes a mail-transmission task of transmitting an e-mail with an attached document from the image processing apparatus to the user terminal, issue a mail address in association with the requested processing flow, wherein the attached document is document data to be processed in the processing flow; a setting unit configured to set, as a "Reply-To" setting of the e-mail, the issued mail address into the mail-transmission task included in the requested processing flow; and a first transmission unit configured to transmit the processing flow set by the setting unit to the image processing apparatus, and wherein the image processing apparatus comprises: a first receiving unit configured to receive the processing flow transmitted by the first transmission unit; and a second transmission unit configured to transmit an e-mail with an attached document to the user terminal, wherein the transmitted e-mail includes, as "Reply-To" setting, the mail address which is set in the mail-transmission task included in the processing flow received by the first receiving unit.

According to another aspect of the present invention, there is provided a system including an information processing apparatus that manages a processing flow including a plurality of tasks, an image processing apparatus that executes at least one of the tasks included in the processing flow, and a user terminal, wherein the information processing apparatus comprises: an issuing unit configured to, if the processing flow requested from the image processing apparatus includes a mail-transmission task of transmitting an e-mail with an attached document from the image processing apparatus to the user terminal, issue an e-mail subject in association with the requested processing flow, wherein the attached document is document data to be processed in the processing flow; a setting unit configured to set the subject issued by the issuing unit in the mail-transmission task of the processing flow such that the issued subject is set as a subject of the e-mail; and a first transmission unit configured to transmit the processing flow set by the setting unit to the image processing apparatus, and wherein the image processing apparatus comprises: a first receiving unit configured to receive the processing flow transmitted by the first transmission unit; and a second transmission unit configured to transmit an e-mail with an attached document to the user terminal, wherein the transmitted e-mail includes, as a subject of the e-mail, the issued subject which is set in the mail-transmission task included in the processing flow received by the first receiving unit.

According to another aspect of the present invention, there is provided an information processing apparatus that manages a processing flow including a plurality of tasks and is connected to an image processing apparatus and a user terminal, the information processing apparatus comprising: an issuing unit configured to, if the processing flow requested from the image processing apparatus includes a mail-transmission task of transmitting an e-mail with an attached document from the image processing apparatus to the user terminal, issue a mail address in association with the requested processing flow, wherein the attached document is document data to be processed in the processing flow; a setting unit configured to set, as a "Reply-To" setting of the e-mail, the issued mail address into the mail-transmission task included in the requested processing flow; and a first transmission unit configured to transmit the processing flow set by the setting unit to the image processing apparatus, and wherein the image processing apparatus comprises: a first receiving unit configured to receive the processing flow transmitted by the first transmission unit; and a second transmission unit configured to transmit an e-mail with an attached document to the user terminal, wherein the transmitted e-mail includes, as "Reply-To" setting, the mail address which is set in the mail-transmission task included in the processing flow received by the first receiving unit.

According to another aspect of the present invention, there is provided an information processing apparatus that manages a processing flow including a plurality of tasks and is connected to an image processing apparatus and a user terminal, the information processing apparatus comprising: an issuing unit configured to, if the processing flow requested from the image processing apparatus includes a mail-transmission task of transmitting an e-mail with an attached document from the image processing apparatus to the user terminal, issue an e-mail subject in association with the requested processing flow, wherein the attached document is document data to be processed in the processing flow; a setting unit configured to set the subject issued by the issuing unit in the mail-transmission task of the processing flow such that the issued subject is set as a subject of the e-mail; and a first transmission unit configured to transmit the processing flow set by the setting unit to the image processing apparatus, and wherein the image processing apparatus comprises: a first receiving unit configured to receive the processing flow transmitted by the first transmission unit; and a second transmission unit configured to transmit an e-mail with an attached document to the user terminal, wherein the transmitted e-mail includes, as a subject of the e-mail, the issued subject which is set in the mail-transmission task included in the processing flow received by the first receiving unit.

According to another aspect of the present invention, there is provided a method for controlling an information processing apparatus that manages a processing flow including a plurality of tasks and is connected to an image processing apparatus and a user terminal, the method comprising: an issuing step of, if the processing flow requested from the image processing apparatus includes a mail-transmission task of transmitting an e-mail with an attached document from the image processing apparatus to the user terminal, issuing a mail address in association with the requested processing flow, wherein the attached document is document data to be processed in the processing flow; a setting step of setting, as a "Reply-To" setting of the e-mail, the issued mail address into the mail-transmission task included in the requested processing flow; and a first transmission step of transmitting the processing flow set in the setting step to the image processing apparatus.

According to another aspect of the present invention, there is provided a method for controlling an information processing apparatus that manages a processing flow including a plurality of tasks and is connected to an image processing apparatus and a user terminal, the method comprising: an issuing step of, if the processing flow requested from the image processing apparatus includes a mail-transmission task of transmitting an e-mail with an attached document from the image processing apparatus to the user terminal, issuing an e-mail subject in association with the requested processing flow, wherein the attached document is document data to be processed in the processing flow; a setting step of setting the subject issued in the issuing step in the mail-transmission task of the processing flow such that the issued subject is set as a subject of the e-mail; and a transmission step of transmitting the processing flow set in the setting step to the image processing apparatus.

According to another aspect of the present invention, there is provided a non-transitory computer-readable medium storing a program for causing a computer to function as: an issuing unit configured to, if a processing flow requested from an image processing apparatus includes a mail-transmission task of transmitting an e-mail with an attached document from the image processing apparatus to a user terminal, issue a mail address in association with the requested processing flow, wherein the attached document is document data to be processed in the processing flow; a setting unit configured to set, as a "Reply-To" setting of the e-mail, the issued mail address into the mail-transmission task included in the requested processing flow; and a transmission unit configured to transmit the processing flow set by the setting unit to the image processing apparatus.

According to another aspect of the present invention, there is provided a non-transitory computer-readable medium storing a program for causing a computer to function as: an issuing unit configured to, if the processing flow requested from an image processing apparatus includes a mail-transmission task of transmitting an e-mail with an attached document from the image processing apparatus to a user terminal, issue an e-mail subject in association with the requested processing flow, wherein the attached document is document data to be processed in the processing flow; a setting unit configured to set the subject issued by the issuing unit in the mail-transmission task of the processing flow such that the issued subject is set as a subject of the e-mail; and a transmission unit configured to transmit the processing flow set by the setting unit to the image processing apparatus.

By merely transmitting an e-mail in reply, desired processing is executed, and even in a processing flow that requires a user operation in mid-flow, the user operation is simplified.

Further features of the present invention will become apparent from the following description of exemplary embodiments with reference to the attached drawings.

BRIEF DESCRIPTION OF THE DRAWINGS

FIGS. 5A and 5B are diagrams showing examples of information to be managed using a processing flow application 420.

FIG. 6 is a diagram showing an example of a UI.

FIG. 7 is a diagram showing an example of a processing flow definition file.

FIG. 9 is a diagram showing an example of a flowchart for setting a reply destination.

FIG. 10 is a diagram showing an example of an edited processing flow definition file.

FIG. 13 is a diagram showing an example of a processing flow definition file.

FIG. 14 is a diagram showing an example of a processing sequence for executing a processing flow.

FIG. 15 is a diagram showing an example of a flowchart for setting a subject.

FIG. 16 is a diagram showing an example of an edited processing flow definition file.

DESCRIPTION OF THE EMBODIMENTS

Embodiments of the present invention will be described below with reference to the drawings.

Embodiment 1

System Configuration Diagram

Figure 1:
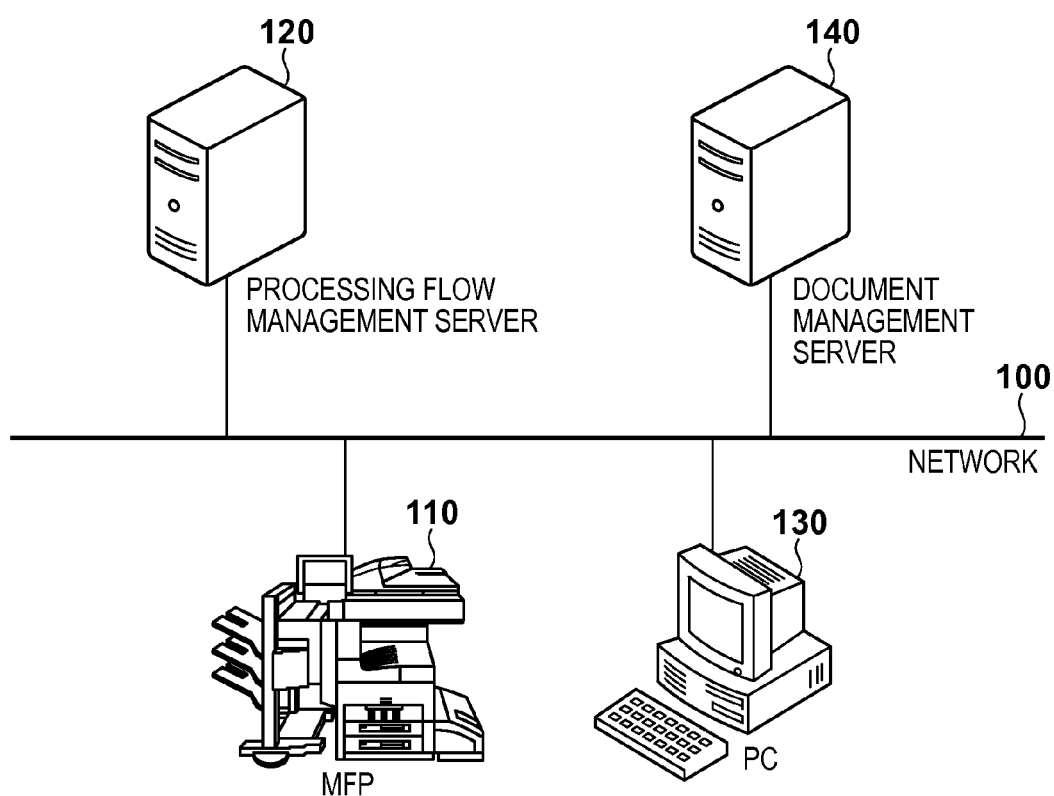
FIG. 1 is a diagram showing an example of a system configuration of a system according to an embodiment.

FIG. 1 is a diagram showing an example of a system configuration of an image processing system according to the present embodiment. The present system includes an MFP 110, a processing flow management server 120, a PC 130, and a document management server 140, and these are connected via a network 100. The network 100 is a foundation for performing communication between apparatuses and it can be an Intranet, the Internet, or another network system.

The MFP 110 has a copying function. Also, the MFP 110 has a transmission function of transmitting document data of a scanned original image to a designated apparatus using a protocol such as FTP (File Transfer Protocol) or SMB (Server Message Block). Also, the MFP 110 can create an e-mail with the document data as an attached file and transmit the e-mail using an e-mail server (not shown).

The processing flow management server 120 is an information processing apparatus and a server that centrally manages a processing flow. An e-mail client is installed in a PC 130, which is a user terminal. The document management server 140 is an information processing apparatus and a server that manages document data. Also, the document management server 140 provides external apparatuses with a service of performing processing such as registration, referencing, or deletion of document data. Note that the present embodiment is not limited to the above-described number of apparatuses. Also, the functions of the various servers may be realized by multiple apparatuses.

Hardware Configuration

Figure 2:
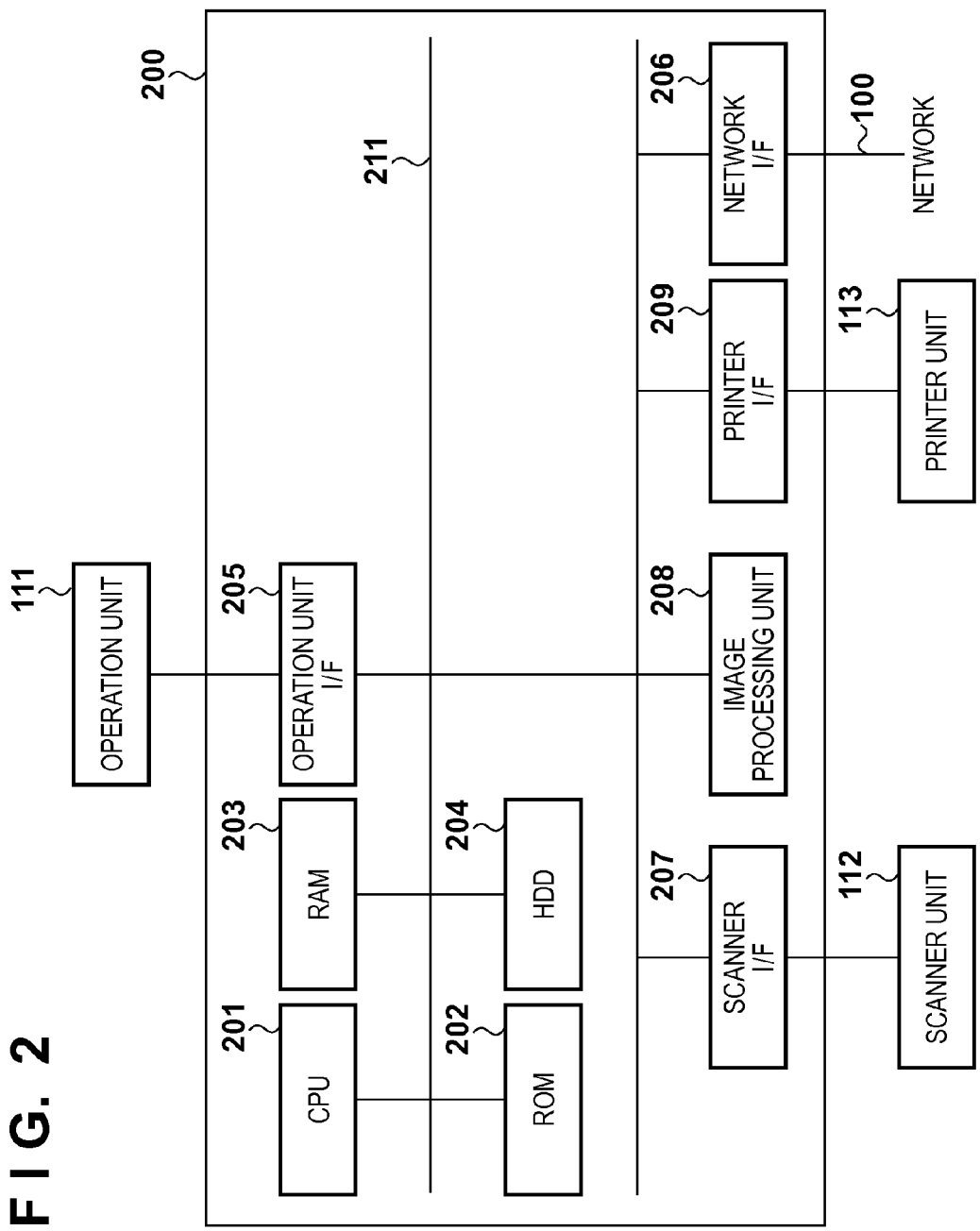
FIG. 2 is a diagram showing an example of a hardware configuration of an MFP 110.

FIG. 2 is a diagram showing an example of a hardware configuration of the MFP 110. As shown in FIG. 2, the MFP 110 has a scanner unit 112, which is an image input device, a printer unit 113, which is an image output device, a controller 200 for performing overall control of the MFP 110, and an operation unit 111.

The scanner unit 112 is a device that reads an image on an original and generates image data. After the original is set on an original feeder (not shown), an instruction to scan the original is provided from the controller 200 to the scanner unit 112. Upon receiving the instruction, the scanner unit 112 feeds the original one page at a time from the original feeder and performs an original scanning operation. Note that the method for scanning the original is not limited to an automatic feeding method performed by the original feeder, and it may be a method in which an original is placed on a glass surface (not shown), and scanning of the original is performed by moving an exposure unit (not shown).

The printer unit 113 is an image forming device that forms image data received from the controller 200 as an image on a sheet. The present embodiment describes an electrophotographic method using a photoreceptor drum or a photoreceptor belt as an example of an image forming method, but it is also possible to use an inkjet method or the like.

The controller 200 is electrically connected to the operation unit 111, the scanner unit 112, and the printer unit 113. Also, the controller 200 is connected to the network 100 as well via a network I/F 206. That is to say, the controller 200 is connected to the other devices through the network 100. Thus, the MFP 110 can perform communication using a protocol such as HTTP (Hyper Text Transfer Protocol).

The CPU 201 performs overall control of access to the various connected devices and access from other devices based on a control program and the like stored in a ROM 202. Also, the CPU 201 performs overall control of various processes performed in the controller 200. This control includes execution of a program for realizing a later-described flowchart.

The ROM 202 is a storage unit that stores an apparatus boot program. A RAM 203 is a system work memory for the operation of the CPU 201 and is a memory for temporarily storing image data. The RAM 203 is configured by an area that holds content stored by a power source backup or the like after the apparatus itself is powered off, and an area in which stored content is deleted after powering off. An HDD 204 is a hard disk drive and can store system software and image data.

An operation unit I/F 205 is an interface unit that connects a system bus 211 to the operation unit 111. The operation unit I/F 205 receives image data to be displayed on the operation unit 111 from the system bus 211 and outputs it to the operation unit 111, and outputs information output from the operation unit 111 to the system bus 211.

The network I/F 206 connects the network 100 to the system bus 211 and performs input and output of information.

A scanner I/F 207 corrects, manipulates, and edits image data received from the scanner unit 112. Additionally, the scanner I/F 207 includes a function of determining whether the received image data is that of a color original, a monochrome original, a document original, a photograph original, or the like.

An image forming unit 208 subjects image data to direction change, image compression, and expansion processing. Also, the image forming unit 208 can create one image by compositing images stored in the HDD 204.

A printer I/F 209 receives image data transmitted from the image forming unit 208 and subjects the image data to image formation while referencing attribute data that accompanies the image data. The image data resulting from image formation is output to the printer unit 113.

In the present embodiment, an MFP will be described using a network MFP that executes UI (User Interface) display, but it may be another image processing apparatus such as a general-purpose computer to which a general-purpose scanner and a general-purpose printer are connected.

Figure 3:
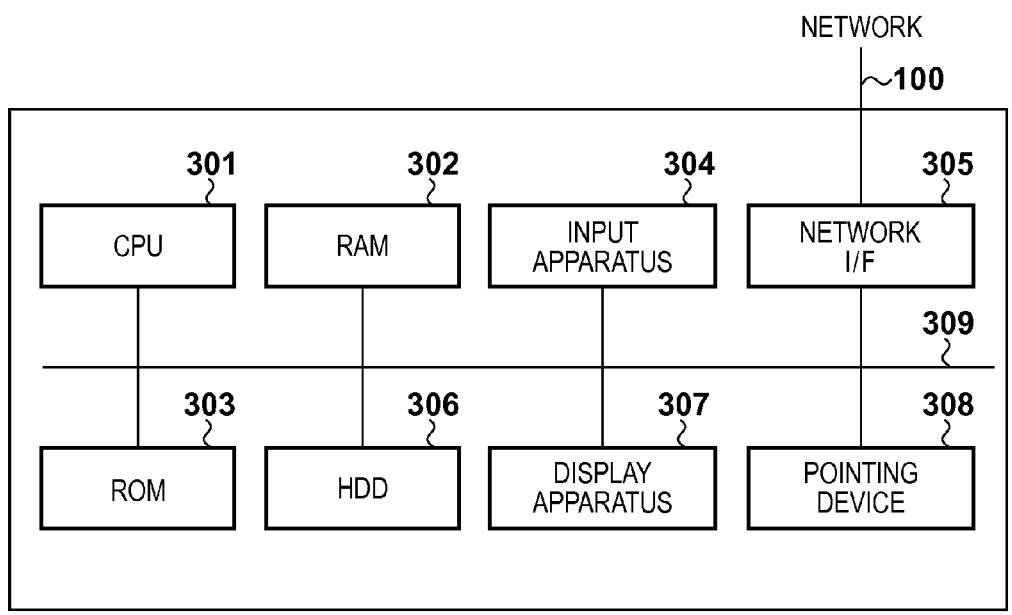
FIG. 3 is a diagram showing a hardware configuration of a processing flow management server 120.

FIG. 3 is a diagram showing an example of a hardware configuration of the processing flow management server 120, the PC 130, and the document management server 140.

In FIG. 3, a CPU 301, a RAM 302, a ROM 303, a Network I/F 305, and a hard disk drive (HDD) 306 are communicably connected to each other via a system bus 309.

Additionally, a display apparatus 307 such as a CRT, an input apparatus 304 such as a keyboard, and a pointing device 308 such as a mouse are communicably connected to each other via the system bus 309.

A control program such as an operating system (OS) is stored in the ROM 303 or the HDD 306. The CPU 301 realizes various functions by reading out the control program from the ROM 303 or the HDD 306 to the RAM 302 and executing it according to need.

Additionally, via the display apparatus 307, the CPU 301 displays various kinds of information and receives user instructions and the like from the input apparatus 304 and the pointing device 308. Furthermore, the CPU 301 performs communication with the other apparatuses on the network 100 via the Network I/F 305.

Software Configuration

Figure 4A:
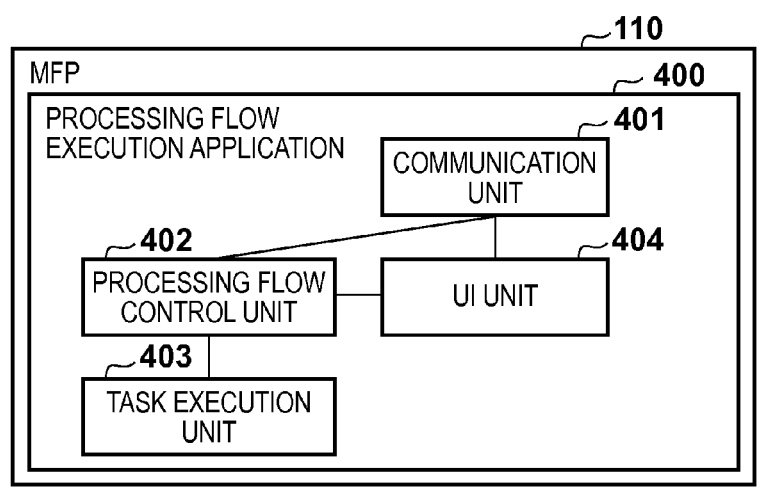
FIGS. 4A, 4B, and 4C are diagrams showing software configurations of apparatuses according to an embodiment.

FIG. 4A is a diagram showing an example of a configuration of software modules for causing the MFP 110 to function as the processing units of a processing flow execution application 400. Due to the program stored in the HDD 204 being executed by the CPU 201 of the MFP 110, the MFP 110 functions as the processing units of the processing flow execution application 400 and the processing of a later-described flowchart is executed. Note that a configuration is also possible using the processing unit in the MFP, a portion of the processing of the later-described flowchart, or all dedicated hardware.

The MFP 110 has the processing flow execution application 400. The processing flow execution application 400 includes a communication unit 401, a processing flow control unit 402, a task execution unit 403, and a UI unit 404.

The communication unit 401 performs communication with the communication units of apparatuses via the Network I/F 206. The communication unit 401 transmits a processing flow request to a communication unit 421 of the processing flow management server 120. Also, the communication unit 401 receives a list of processing flows from the communication unit 421 of the processing flow management server 120 and transmits it to the processing flow control unit 402.

The processing flow control unit 402 performs processing flow analysis. Upon receiving an instruction to execute the processing flow from the UI unit 404, the processing flow control unit 402 acquires the processing flow details from the processing flow management server 120 via the communication unit 401. Then, the processing flow control unit 402 analyzes the acquired processing flow and divides it into tasks. The processing flow control unit 402 furthermore performs notification to the task execution unit 403 such that the tasks are executed in the order that they are designated in the processing flow.

The task execution unit 403 executes tasks received from the processing flow control unit 402. Tasks executed by the task execution unit 403 include scanning of originals, document data printing and transmission (e-mail, fax, files, etc.), and the like.

The UI unit 404 performs display on the operation unit 111 and processes user input from the operation unit 111 via the operation unit I/F 205. The UI unit 404 displays a button for executing the processing flow acquired from the processing flow management server 120 via the communication unit 401. Furthermore, when the button is pressed due to a user operation, the UI unit 404 instructs the processing flow control unit 402 to execute the processing flow.

Figure 4B:
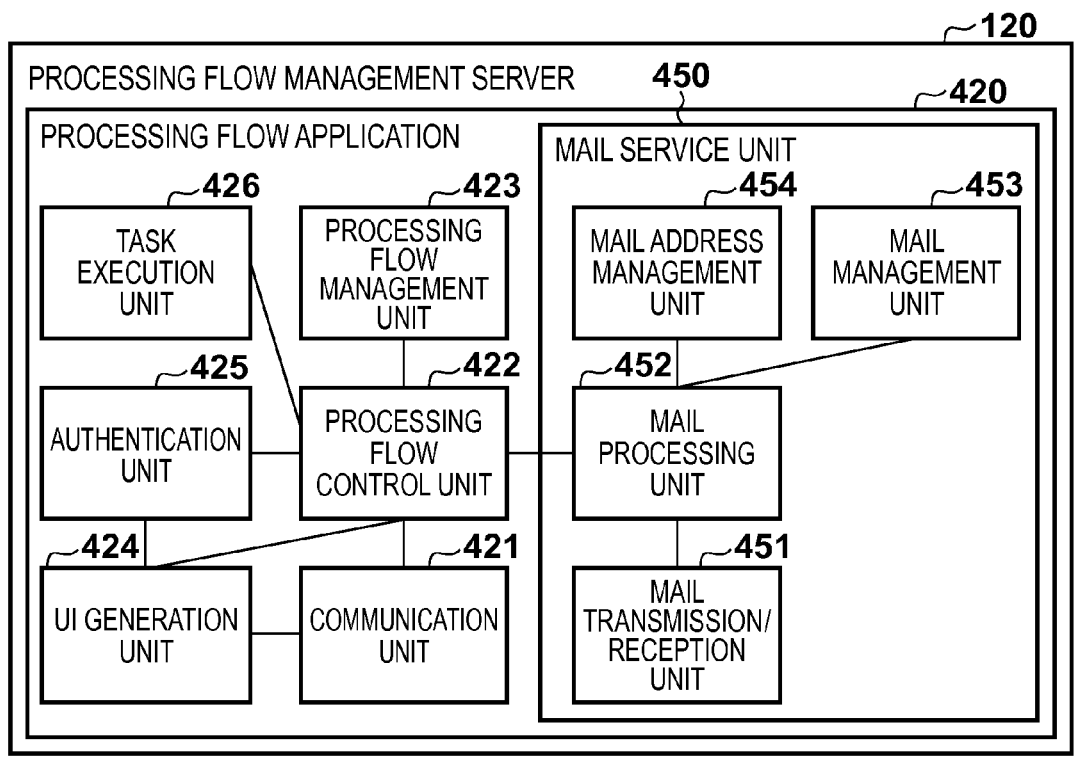

FIG. 4B is a diagram showing an example of a configuration of software modules for causing the processing flow management server 120 to function as the processing units of a processing flow application 420. A program stored in the HDD 306 functions as the processing units of the processing flow application 420 due to the CPU of the processing flow management server 120 and a later-described flowchart is executed.

The processing flow management server 120 has the processing flow application 420. The processing flow application 420 includes a communication unit 421, a processing flow control unit 422, a processing flow management unit 423, a UI generation unit 424, an authentication unit 425, a task execution unit 426, and a mail service unit 450. Note that in the present embodiment, the processing flow application 420 has the mail service unit 450, but the mail service unit 450 may be configured as a separate application. Also, a configuration is possible in which the mail service unit 450 is arranged on a separate server that is independent of the processing flow management server 120.

The communication unit 421 performs communication with the communication units of various apparatuses via the Network I/F 305. The processing flow control unit 422 controls processing related to the processing flow. The processing flow control unit 422 acquires a processing flow via the processing flow management unit 423. Then, the processing flow control unit 422 analyzes the acquired processing flow and divides it into tasks. The processing flow control unit 422 furthermore performs notification to the task execution unit 426 such that the tasks that are to be executed by the processing flow application 420 are executed in the order that they are designated in the processing flow. Also, the processing flow control unit 422 edits and manipulates the acquired processing flow.

The processing flow management unit 423 manages a processing flow management table 500. The processing flow management table 500 will be described later in detail with reference to FIG. 5A. The processing flow management unit 423 receives an instruction from the processing flow control unit 422 and acquires a processing flow from the processing flow management table 500. Also, the processing flow management unit 423 receives an instruction from the processing flow control unit 422 and registers a processing flow in the processing flow management table 500.

The UI generation unit 424 receives a request via the communication unit 421 from a web browser (not shown) operating on the PC 130 or the like and generates a screen for creating a processing flow using HTML (HyperText Markup Language) or the like. The UI generation unit 424 transmits the generated screen to the web browser via the communication unit 421.

An authentication unit 425 authenticates the processing flow application 420. The authentication unit 425 manages authentication information (user name and password) (not shown) that allows the user to log in to the processing flow application 420. The authentication unit 425 compares authentication information received from the web browser and authentication information managed by the authentication unit 425 and determines whether or not login is possible.

The task execution unit 426 executes tasks received from the processing flow control unit 422. Tasks executed by the task execution unit 426 include image processing such as format change, and registration of document data in the document management server 140. Note that the processing of the tasks may not necessarily be executed by the task execution unit 426. For example, a configuration is possible in which the task execution unit 426 requests an image processing web service or the like that is made available by an external server (not shown) to process document data and the task is executed due to the processed document data being received.

The mail service unit 450 includes a mail server function. The mail service unit 450 includes a mail transmission/receiving unit 451, a mail processing unit 452, a mail management unit 453, and a mail address management unit 454. The mail transmission/receiving unit 451 performs mail transmission and reception. The mail processing unit 452 analyzes mail. Also, the mail processing unit 452 requests the mail management unit 453 to store mail.

The mail management unit 453 manages mail. The mail management unit 453 receives a storage instruction from the mail processing unit 452 and stores mail. Also, the mail management unit 453 receives instructions from the mail processing unit 452 and transmits document data attached to the mail to the mail processing unit 452.

The mail address management unit 454 manages a mail address management table 550. The mail address management table 550 will be described later in detail with reference to FIG. 5B. The mail address management unit 454 receives a registration instruction from the mail processing unit 452, issues a mail address, and registers it in the mail address management table 550. Also, the mail management unit 453 receives a deletion instruction from the mail processing unit 452 and deletes a mail address from the mail address management table 550.

Figure 4C:
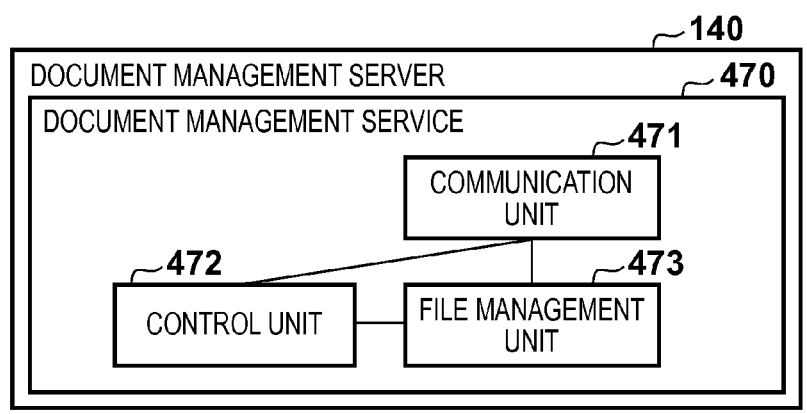

FIG. 4C is a diagram showing an example of a configuration of software modules for causing the document management server 140 to function as the processing units. The program that is stored in the HDD 306 included in the document management server 140 functions as the processing units of the document management service 470 due to being executed by the CPU of the document management server 140.

The document management server 140 has the document management service 470. The document management service 470 is a web application. The document management service 470 has a communication unit 471, a control unit 472, and a file management unit 473. The communication unit 471 receives a request from the processing flow management server 120 and the like and transmits the content of the request to the control unit 472. The communication unit 471 furthermore receives processing results for the request from the control unit 472, creates response data for the request, and transmits the response to the processing flow management server 120 and the like.

In accordance with the content of the request transmitted from communication unit 471, the control unit 472 requests the file management unit 473 to perform processing such as storing, deleting, and moving the transmitted file, and acquiring the list of files being managed.

In response to the processing request transmitted from the control unit 472, the file management unit 473 carries out the storage, deletion, and movement of the transmitted file, and the acquisition of the list of files being managed and transmits the processing result to the control unit 472.

FIG. 5A is an example of a processing flow management table that is managed by the processing flow management unit 423. Although the table is shown schematically in a table format in the present embodiment, it may be a CSV format or a text file in XML or the like. The processing flow management table 500 is configured by columns 501 to 504. One record corresponds to one processing flow.

Column 501 shows processing flow IDs. A processing flow ID is an identifier for uniquely identifying a processing flow. For example, the processing flow ID of the first record shown in FIG. 5A is "75301938". Column 502 shows names of processing flows. For example, the name of the processing flow in the first record is "Form data transmission". Column 503 shows disclosure destinations of processing flows. For example, the disclosure destination of the processing flow in the first record is "tsato". This shows that a processing flow is to be displayed when the user whose user name is "tsato" logs in to the MFP 110. Column 504 shows processing flow definition files. The definition file of a processing flow will be described later with reference to FIG. 7.

FIG. 5B is an example of a mail address management table that is managed by the mail address management unit 454. Although the table is shown schematically in a table format in the present embodiment, it may be a CSV format or a text file in XML or the like. The mail address management table 550 is configured by columns 551 to 554. One record corresponds to one piece of mail address data.

Column 551 shows mail addresses issued by the mail address management unit 454. Column 552 shows processing flow IDs associated with the mail addresses. For example, the processing flow ID of the first record in the mail address management table 550 is "75301938", and it is associated with the processing flow of the first record in the processing flow management table 500.

Column 553 shows days and times on which processing flows were requested from the MFP 110. In the present embodiment, a mail address is issued when a definition file for a processing flow is requested from the MFP 110, although this will be described in detail later. The day and time of issuing are registered in the present column. Column 554 indicates whether or not the mail address is valid. If it is set to "true", the mail address is valid. If it is set to "false", the mail address is invalid.

Creation of Processing Flow

First, the user inputs a URL (Uniform Resource Locator) for a processing flow application in the web browser (not shown) operating on the PC 130 or the like, and performs a request instruction. Upon receiving the request instruction, the web browser requests a screen to the processing flow application 420. Upon receiving the request from the web browser, the processing flow application 420 generates a login screen using the UI generation unit 424. The processing flow application 420 transmits the login screen to the web browser as a response.

The user inputs a user name and password in the login screen (not shown) displayed in the web browser, and performs a login instruction to the web browser by pushing a predetermined button and the like. Upon receiving the login instruction, the web browser transmits the user name and the password to the processing flow application 420. The authentication unit 425 of the processing flow application 420 performs authentication using the user name and password received from the web browser. If authentication is successful, the UI generation unit 424 of the processing flow application 420 generates a screen for creating a processing flow and transmits it to the web browser via the communication unit 421. Then, the web browser displays the processing flow creation screen.

FIG. 6 is an example of a UI in which the screen that was generated by the UI generation unit 424 of the processing flow application 420 is displayed in the web browser operating on the PC 130 and the like. A reception unit for the processing flow is realized according to this. The web browser displays a processing flow creation screen 600. An input field 601 is an input field that receives the input of a character string for setting a processing flow name. An area 602 is an area including input fields for performing scan settings. In the example of the processing flow creation screen 600, it is possible to set "document size", "color mode", "resolution", and "scale".

A checkbox 603 is a checkbox for setting whether or not the user is to perform document editing during the processing flow. When the checkbox 603 is checked in the processing flow creation screen 600, an input field 604, a checkbox 605, an input field 606, and a checkbox 607 are enabled and input is possible.

An input field 604 is an input field that receives the input of a character string for setting an e-mail address. When the processing flow is to be executed, the MFP 110 transmits an e-mail with the document data as an attached file to the e-mail address set in the input field 604. By editing the attached document data, the user can edit the document data during the processing flow. The document data here is generated as the result of processing of a task performed by the MFP 110, which is an image forming apparatus, for example. Note that in the present embodiment, an input field that receives a character string is used as the input field for setting an e-mail address, but another method may also be used. For example, a selection type of input field may be used in which an e-mail address is selected from a list of e-mail addresses managed by the processing flow application 420.

A checkbox 605 is a checkbox for setting whether or not to set an e-mail address when the processing flow is executed. For example, it is presumed that a check is placed in the checkbox 605 and a processing flow is created. When the processing flow is executed by the MFP 110, the MFP 110 displays the screen for setting the e-mail address. By enabling the setting of an e-mail address when a processing flow is executed in this way, it is possible to use an e-mail address in an address book (not shown) or the like that is managed by the MFP 110.

An input field 606 is a selection type of input field for setting the file format of the document data that is to be transmitted as the attached file of the e-mail. For example, "PDF" (Portable Document Format) has been selected in the input field 606. It is possible to select the file format here according to the function and the like of the PC 130 used by the user.

A checkbox 607 is a checkbox for setting whether or not to perform an electronic signature check when the processing flow application 420 receives an e-mail reply. Processing of the processing flow application 420 when the e-mail reply is received will be described later.

Area 608 is an area including an input field for setting image processing executed by the task execution unit 426 of the processing flow application 420. Settings related to image processing can be performed by performing input into the input field arranged in area 608. Area 609 is an area including an input field for setting transmission to the document management server 140 that is executed by the task execution unit 426 of the processing flow management application. Setting of a path to the document management server 140 and authentication information can be performed.

A button 610 is a button for instructing the creation of a processing flow. When the button 610 is pressed, the web browser transmits the information input in the processing flow creation screen 600 to the processing flow application 420. The processing flow control unit 422 analyzes the received information and the processing flow application 420 creates the definition file of the processing flow. Then, according to an instruction from the processing flow control unit 422, the processing flow management unit 423 registers the created processing flow definition file in the processing flow management table 500. A button 611 is a button for canceling the creation of a processing flow.

FIG. 7 is an example of a processing flow definition file stored in column 504 of the processing flow management table 500. The format of a processing flow definition file 700 may be any format as long as it is a format that can be processed by the processing flow application 420 and the processing flow execution application 400. Multiple tasks are set in the processing flow definition file 700. Also, the order of the setting of tasks listed in the processing flow definition file 700 indicates the order of performing the tasks.

Tag 701 is a "JobScript" tag that indicates one processing flow. Attributes 702 to 704 relating to the processing flow are listed in this tag. The attribute 702 is a "name" attribute that indicates the name of the processing flow. The name of this processing flow is "Form data transmission". The content that was input in the input field 601 is taken as the value of the attribute 702. The attribute 703 is a "user" attribute that indicates the disclosure destination of the processing flow. It is "tsato" in the present processing flow. The attribute 704 is an "id" attribute that indicates the ID of the processing flow. The ID of the present processing flow is "75301938". That is to say, the definition file of the present processing flow is "23153.xml", which is in the first record of the processing flow management table 500 shown in FIG. 5A.

Tag 705 is a "Scan" tag that indicates a task related to scanning. Settings for tasks related to scanning are listed in this tag. The content input in area 602 is declared in this tag. That is to say, the four setting values that were set in area 602 are listed here.

Tag 706 is a "Send" tag that indicates a task related to e-mail transmission. Settings for tasks related to e-mail transmission are listed in this tag. Tag 707 is an "EmailAddress" tag in which an e-mail address is declared. In the present processing flow, it indicates that an e-mail will be transmitted to "user_tsato@abc.co.jp". The content input in the input field 604 is declared in the value of this tag.

Tag 708 is "SettingMFP" that declares whether or not the e-mail address is to be set when the processing flow is executed by the MFP 110. In the present processing flow, "true" is set, which indicates that a screen for setting the e-mail address is to be displayed when the processing flow is executed. The content input in the checkbox 605 is declared in the value of this tag.

Tag 709 is a "FileFormat" tag that indicates the file format of the document data that is to be transmitted as the attached file in the e-mail. In the present processing flow, "PDF" is set, which indicates that the file format of the document data is PDF. Tag 710 is a "Signature" tag that indicates whether or not an electronic signature check is to be performed when the processing flow application 420 receives an e-mail response. In the present processing flow, "true" is set, which indicates that an electronic signature check is to be performed. The content input in the checkbox 607 is declared in this tag.

Tag 711 is an "Imaging" tag that indicates settings of tasks related to image processing executed by the task execution unit 426 of the processing flow application 420. The content input in area 608 is declared in this tag. Tag 712 is a "Connector" tag that indicates settings of tasks related to transmission to the document management server 140 executed by the task execution unit 426 of the processing flow application 420. The content input in area 609 is declared in this tag.

Execution of Processing Flow by MFP 110

First, the user presses a button for starting up the processing flow execution application 400 that is displayed on the UI of the MFP 110. Upon receiving the press of the button, the MFP 110 starts up the processing flow execution application 400. Then, the UI unit 404 of the processing flow execution application 400 displays a screen that receives input of authentication information (not shown). After receiving input of the authentication information by the user, the UI unit 404 receives an instruction to access the processing flow application 420 due to the pressing of a predetermined button or the like. The following will be described with reference to FIG. 8.

Figure 8:
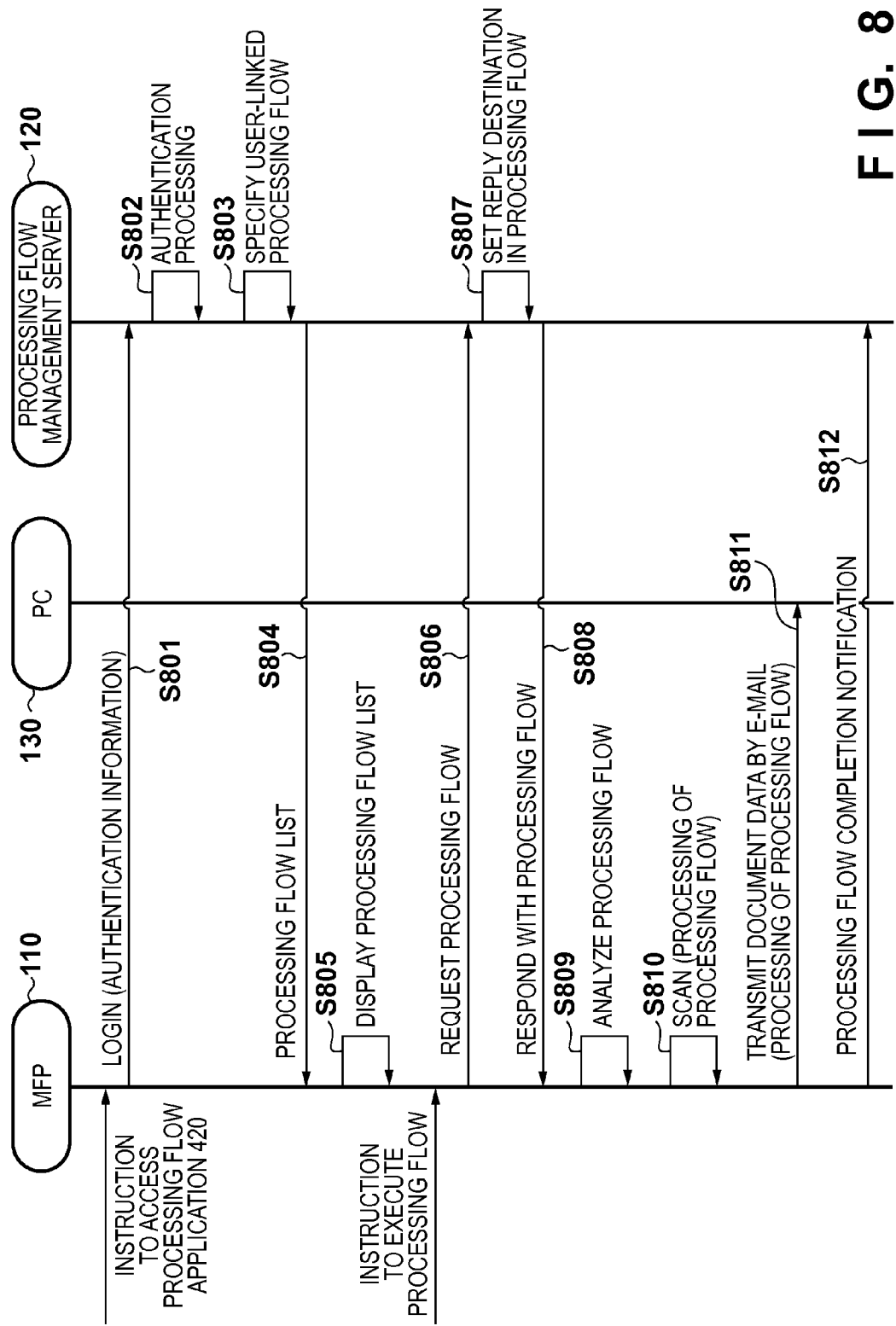
FIG. 8 is a diagram showing an example of a processing sequence in the execution of the processing flow.

FIG. 8 shows a processing sequence of the MFP 110, the processing flow management server 120, and the PC 130 when the processing flow is to be executed by the MFP 110.

Upon receiving the instruction to access the processing flow application 420, the MFP 110 transitions to step S801. In step S801, the processing flow execution application 400 of the MFP 110 requests the processing flow management server 120 to log in to the processing flow application 420. At this time, the processing flow execution application 400 transmits the authentication information that was input in the above-described screen for receiving the input of the authentication information. Then, the processing flow application 420 of the processing flow management server 120 receives the login request via the communication unit 421.

In step S802, the authentication unit 425 of the processing flow application 420 performs authentication processing by comparing the authentication information included in the login request that was received in step S801, and the authentication information managed by the authentication unit 425. If the authentication is successful, the procedure moves to step S803. If the authentication fails, the UI generation unit 424 generates an authentication error screen and transmits it to the MFP 110 via the communication unit 421.

In step S803, the processing flow control unit 422 requests the processing flow management unit 423 to acquire a list of processing flows that are linked to the user name included in the authentication information. The processing flow management unit 423 performs specification of processing flows linked to the user name by comparing the received user name and column 503 of the processing flow management table 500.

In step S804, the processing flow control unit 422 transmits a list of processing flows received from the processing flow management unit 423 to the MFP 110 via the communication unit 421. The processing flow execution application 400 of the MFP 110 receives the list of processing flows via the communication unit 401. Note that the processing flow list need only include the processing flow name, processing flow ID, and the like, and it need not include the processing flow definition file stored in column 504 in particular.

In step S805, the UI unit 404 of the processing flow execution application 400 displays a list of buttons (not shown) for executing the received processing flow. When one of the buttons for executing the processing flow is pressed by the user here, the UI unit 404 receives it as a processing flow execution instruction related to the pressed button, and the procedure moves to step S806.

In step S806, the UI unit 404 requests a processing flow from the processing flow management server 120 via the communication unit 401. At this time, the UI unit 404 also transmits the ID of the processing flow that was received as an execution instruction. The communication unit 421 of the processing flow application 420 receives the processing flow request and the procedure moves to step S807.

In step S807, the processing flow application 420 performs processing for setting the e-mail reply destination in the requested processing flow. The following will be described with reference to FIG. 9. FIG. 9 is a flowchart according to the processing flow application 420, showing an example of the processing in step S807.

In step S901, the processing flow control unit 422 specifies the processing flow that is linked to the processing flow ID included in the processing flow request that was received in step S806. Specifically, the processing flow control unit 422 transmits a processing flow ID to the processing flow management unit 423 and instructs the specification of the processing flow. The processing flow management unit 423 specifies the processing flow by comparing column 501 of the processing flow management table 500 with the processing flow ID received from the processing flow control unit 422. The processing flow management unit 423 acquires the definition file of the specified processing flow from column 504 and transfers it to the processing flow control unit 422. When the processing flow control unit 422 receives the processing flow definition file, the procedure transitions to step S902.

In step S902, the processing flow control unit 422 analyzes the processing flow definition file received in step S901 and determines whether or not "user document editing" settings (corresponding to checkbox 603 in FIG. 6) have been performed in the processing flow task. Specifically, the processing flow control unit 422 searches for a "Send" tag. If there is a "Send" tag, this allows the document to be transmitted to the user, checked, and edited, and therefore it is determined that "user document editing" settings have been performed (YES in step S902), and the procedure transitions to step S903. If there is no "Send" tag, it is determined that "user document editing" settings have not been performed (NO in step S902), and the procedure transitions to step S905. For example, according to the example of the processing flow definition file 700, since tag 706 is a "Send" tag, it is determined that "user document editing" settings have been performed.

In step S903, the processing flow control unit 422 sends a request via the mail processing unit 452 to the mail address management unit 454 to issue a mail address linked to the processing flow. At that time, the processing flow control unit 422 transfers the linked processing flow ID. The mail address management unit 454 issues a mail address that does not exist in the mail address management table 550. Accordingly, the same e-mail address is not issued, and there is a one-to-one relationship between the mail address and the processing flow. Next, the mail address management unit 454 registers the issued mail address, the processing flow ID received from the processing flow control unit 422, the current date and time, and a setting indicating that the mail address is valid ("true") in the columns of the mail address management table 550. Then, the mail address management unit 454 transfers the issued mail address to the processing flow control unit 422 via the mail processing unit 452.

In step S904, the processing flow control unit 422 adds the mail address received in step S903 to the task in the processing flow definition file as the "Reply-To" setting in the e-mail, and the procedure transitions to step S905.

In step S905, settings for tasks that are to be executed by the task execution unit 426 in the processing flow application 420 of the processing flow management server 120 are deleted from the processing flow definition file by the processing flow control unit 422 and the present processing flow ends. For example, in the case of the processing flow definition file 700, the tags included in the tag 705 and the tag 706 are executed by the MFP 110, and the tags included in the tag 711 and the tag 712 are executed by the processing flow application 420. Because of this, the processing flow control unit 422 deletes the settings for the tasks in tag 711 and tag 712. Note that in the present embodiment, the processing flow control unit 422 realizes the deletion above by internally managing tasks that can be executed by the task execution unit 426. By deleting the setting of tasks in step S905, only the settings of tasks executed by the MFP 110 remain. Accordingly, only information regarding tasks to be executed by the MFP 110 is transferred to the MFP 110 and unnecessary information (information regarding tasks executed by servers) is not transferred over the network 100.

FIG. 10 is an example of a processing flow definition file after the flowchart shown in FIG. 9 has been processed. Note that the processing flow definition file shown in FIG. 10 is the processing flow definition file 700 shown in FIG. 7 after having undergone processing. Because of this, only the differences therebetween will be described here.

Tag 1001 is a "ReplyTo" tag that shows the reply destination of the e-mail. If this tag is included, the processing flow execution application 400 of the MFP 110 sets the e-mail address declared in this tag in the "Reply-To" header in the e-mail when the e-mail is to be transmitted. The mail address in tag 1001 is "dha9apcgap1hv@flowservice.bcd.com". This is the mail address of the first record in the mail address management table 550.

Tag 1002 is a "/JobScript" tag that shows that the definition of the processing flow is ending. In comparison with the processing flow definition file 700, the tags included in the tag 711 and the tag 712 are deleted and the definition of the processing flow ends. This is deleted in step S905 since the tag 711 and the tag 712 are settings for tasks executed by the processing flow application 420. By doing this, only the processing flow tasks executed by the MFP 110 are transferred to the MFP 110. Because of this, information such as authentication information for the document management server 140 listed in tag 712, for example, is not needlessly transferred over the network 100.

The description will now return to FIG. 8. In step S808, the processing flow control unit 422 transmits the processing flow definition file (e.g. FIG. 10) after the flowchart shown in FIG. 9 has been processed to the MFP 110. The processing flow execution application 400 of the MFP 110 receives the processing flow definition file via the communication unit 401.

In step S809, the processing flow control unit 402 of the processing flow execution application 400 analyzes the processing flow and divides it into tasks. Note that as a result of the analysis, if "set e-mail address when processing flow is executed" (corresponds to checkbox 605, "Setting MFP" tag in FIG. 6) has been set, the UI unit 404 displays a UI (not shown) for receiving e-mail address settings. The initial value at this time is the mail address set in the "EmailAddress" tag. When an instruction to establish the mail address is received due to an operation such as the user pressing a button, the procedure moves to step S810. If "set e-mail address when processing flow is executed" has not been set, the UI unit 404 transitions to step S810 without displaying any UI in particular.

In step S810, the processing flow control unit 402 instructs the task execution unit 403 to execute a scan task using the settings defined in the processing flow. The task execution unit 403 executes scanning using the settings set in the processing flow. Note that the processing here is a task defined in the processing flow shown in FIG. 10 and if other tasks are defined, the tasks are executed in accordance with those settings.

In step S811, the processing flow control unit 402 instructs the task execution unit 403 to execute an e-mail transmission task using the settings defined in the processing flow. The task execution unit 403 executes the e-mail transmission using the settings listed in the processing flow. In actuality, the task execution unit 403 transmits the e-mail to an e-mail server (not shown). Then, an e-mail client operating in the PC 130 receives the e-mail from the e-mail server due to a user instruction, and thereby the e-mail is stored in the PC 130. Note that, as described above, if the "ReplyTo" tag is included in the processing flow, the task execution unit 403 sets the e-mail address declared in the "ReplyTo" tag in the "Reply-To" header in the e-mail.

In step S812, the processing flow control unit 402 transmits a processing flow completion notification to the processing flow management server 120 via the communication unit 401. Note that if the e-mail address of the transmission destination is changed or the like in step S809, the changed e-mail address is included in the processing flow completion notification. The processing flow application 420 of the processing flow management server 120 receives the processing flow completion notification via the communication unit 421. If an e-mail address is included in the processing flow completion notification, the processing flow application 420 temporarily stores the e-mail address. At this time, the e-mail address that is to be stored corresponds to the mail address of the PC 130 by which a user operation is performed. The e-mail address is stored here so as to be used to check the transmission source when the replied e-mail is received, and this will be described in detail later.

E-Mail Reply

Next, the user checks the e-mail using an e-mail client or the like that operates on the PC 130. Then, by operating a tool or the like for editing document data, the user edits the document data attached to the e-mail received in step S811. When the editing is finished, the user again operates the e-mail client operating on the PC 130, creates an e-mail to reply to the e-mail received in step S811, and attaches the edited document data (data after a user operation). Then, the e-mail client receives the user instruction and performs an e-mail reply. The e-mail address set as the reply destination here is declared in the "ReplyTo" tag of the processing flow definition file. Because of this, the e-mail is transmitted to the processing flow application 420 of the processing flow management server 120. Thus, in the present embodiment, it is sufficient that standard applications such as a web browser, an e-mail client, and a tool for editing document data are installed in the PC 130, and no application or the like related to the processing flow is needed in particular.

Figure 11:
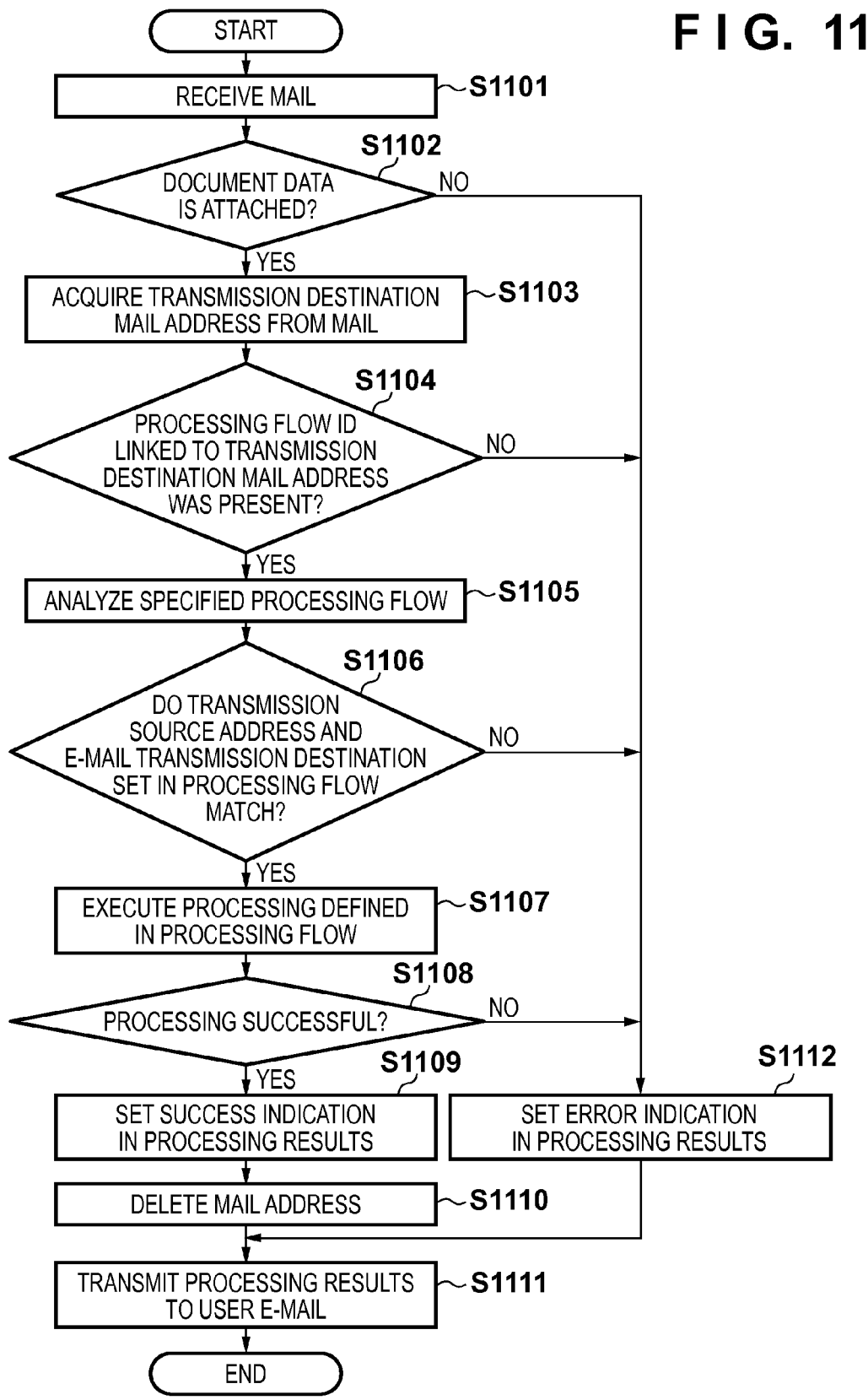
FIG. 11 is a diagram showing an example of a flowchart for receiving an e-mail.

FIG. 11 is a flowchart for the processing flow application 420 that illustrates an example of processing in the case where an e-mail is received from the PC 130 after an operation by the user.

In step S1101, the mail transmission/receiving unit 451 receives the e-mail. The received e-mail is transferred to the mail processing unit 452. Note that if the e-mail has a large size and is divided into pieces, the mail processing unit 452 joins the divided e-mail pieces together again.

In step S1102, the mail processing unit 452 checks whether or not the document data attached to the e-mail is present. The document data here is data after a user operation in the PC 130. If the attached document data is present (YES in step S1102), the mail management unit 453 stores the received e-mail. Then, the mail processing unit 452 notifies the processing flow control unit 422 that it has been stored, and the procedure transitions to step S1103. If there is no attached document data (NO in step S1102), the procedure transitions to step S1112.

In step S1103, the processing flow control unit 422 transmits a request via the mail processing unit 452 to the mail management unit 453 to acquire the document data attached to the e-mail and the transmission destination mail address. The mail management unit 453 acquires the attached document data and the transmission destination mail address from the stored e-mail and transfers them to the mail management unit 453 via the mail processing unit 452.

In step S1104, the processing flow control unit 422 transfers the transmission destination mail address to the mail address management unit 454 via the mail processing unit 452 and requests specification of the processing flow. The mail address management unit 454 specifies the processing flow ID from the received transmission destination mail address. Specifically, the mail address management unit 454 compares column 551 of the mail address management table 550 with the transmission destination mail address. As a result of the comparison, if there is no matching record (NO in step S1104), the procedure transitions to step S1112. If there is a matching record, the mail address management unit 454 checks the availability in column 554 of that record can be used. If column 554 is "false" (NO in step S1104), the procedure transitions to step S1112. If column 554 is "true" (YES in step S1104), the mail address management unit 454 acquires the processing flow ID in column 552. At this time, the mail address management unit 454 sets the availability of column 554 to "false" and the procedure transitions to step S1105. By operating column 554 in this way, when the processing of steps S1105 to S1109 is executed, processing flows are not executed redundantly even in the case where an e-mail is transmitted to the same mail address.

In step S1105, the processing flow control unit 422 acquires the processing flow definition file that is linked to the processing flow ID received in step S1104 from the processing flow management unit 423. Then, the processing flow control unit 422 analyzes the acquired processing flow.

In step S1106, the processing flow control unit 422 compares the e-mail address ("EmailAddress" tag) set in the processing flow with the transmission source address ("From" header) in the reply e-mail. For example, in the case of the processing flow definition file 700, the processing flow control unit 422 compares "user_tsato@abc.co.jp" with the transmission source address of the e-mail. At this time, if the e-mail address stored in step S812 is present, the processing flow control unit 422 compares the stored e-mail address with the transmission source address of the e-mail.

If the addresses match (YES in step S1106), the procedure transitions to step S1107. If the addresses do not match (NO in step S1106), the procedure transitions to step S1112. Note that if "true" is set in the "Signature" tag as in the processing flow definition file 700, the processing flow control unit 422 furthermore requests the mail processing unit 452 to verify the electronic signature of the e-mail. If the electronic signature is valid, the procedure transitions to step S1107. If the electronic signature is not included or it is invalid, the procedure transitions to step S1112. Accordingly, it is possible to realize the prevention of fraud by forgery or manipulation.

In step S1107, the processing flow control unit 422 requests the task execution unit 426 to execute a task in order to continue the processing listed in the processing flow definition file. The task execution unit 426 executes the task requested by the processing flow control unit 422. If the tasks that are defined in the processing flow and are to be executed by the processing flow application are all to be executed, or if an error occurs during the processing of the tasks, the procedure transitions to step S1108. For example, in the case of the processing flow definition file 700, when tasks for image processing listed in the tag 711 and tasks for transmission to the document management server 140 listed in the tag 712 are to be executed, the procedure transitions to step S1108.

In step S1108, the processing flow control unit 422 checks whether or not all tasks were successfully carried out. If all of the tasks were completed normally (YES in step S1108), the procedure transitions to step S1109. If they failed (NO in step S1108), the procedure transitions to step S1112. In step S1109, the processing flow control unit 422 sets an indication of success in the processing results and the procedure transitions to step S1110.

In step S1110, the processing flow control unit 422 transmits a request via the mail processing unit 452 to the mail address management unit 454 to delete the mail address linked to the processing flow whose execution is complete. The mail address management unit 454 deletes the record of the mail address whose deletion was requested from the mail address management table 550, and the procedure transitions to step S1111. By deleting the issued mail address in this way, it is possible to prevent the processing flow from being executed redundantly.

In step S1111, the processing flow control unit 422 requests the mail management unit 452 to transmit the e-mail of the processing results. The mail processing unit 452 creates an e-mail of the processing results and transmits it via the mail transmission/receiving unit 451. Note that at this time, the address of the e-mail is the e-mail address that was set to be the transmission source ("From" header) of the e-mail received in step S811. Accordingly, the user can be notified of the processing results.

In step S1112, the processing flow control unit 422 cancels the processing flow, sets an indication that an error occurred in the processing results, and the procedure moves to step S1111. Note that at this time, a URL for validating the invalidated e-mail address ("false" in column 554) may be set. Accordingly, after resolving the cause of the error, the user can execute the processing flow once more. Also, a URL or the like for deleting the issued e-mail may be set.

Accordingly, an unneeded e-mail address can be deleted from the mail address management table.

As described above, according to the present embodiment, an e-mail address is issued for each processing flow and set as the reply destination of the e-mail. Accordingly, since the desired processing is executed by a user merely replying with an e-mail, user operations are simple in a processing flow in which a user operation is needed midway.

Embodiment 2

Embodiment 2 will be described next. In Embodiment 1, processing for issuing an e-mail address for each processing flow was described. In Embodiment 2, processing will be described with respect to the case of having only one e-mail address for executing the processing flow. Since the system configuration, the hardware configuration, the MFP 110, and the software configuration of the document management server 140 are the same as those in Embodiment 1, the description thereof will not be repeated. Note that in the present specification, a "subject" refers to a title that is set when an e-mail is created.

Software Configuration of Processing Flow Management Server 120

Figures 12A, 12B:
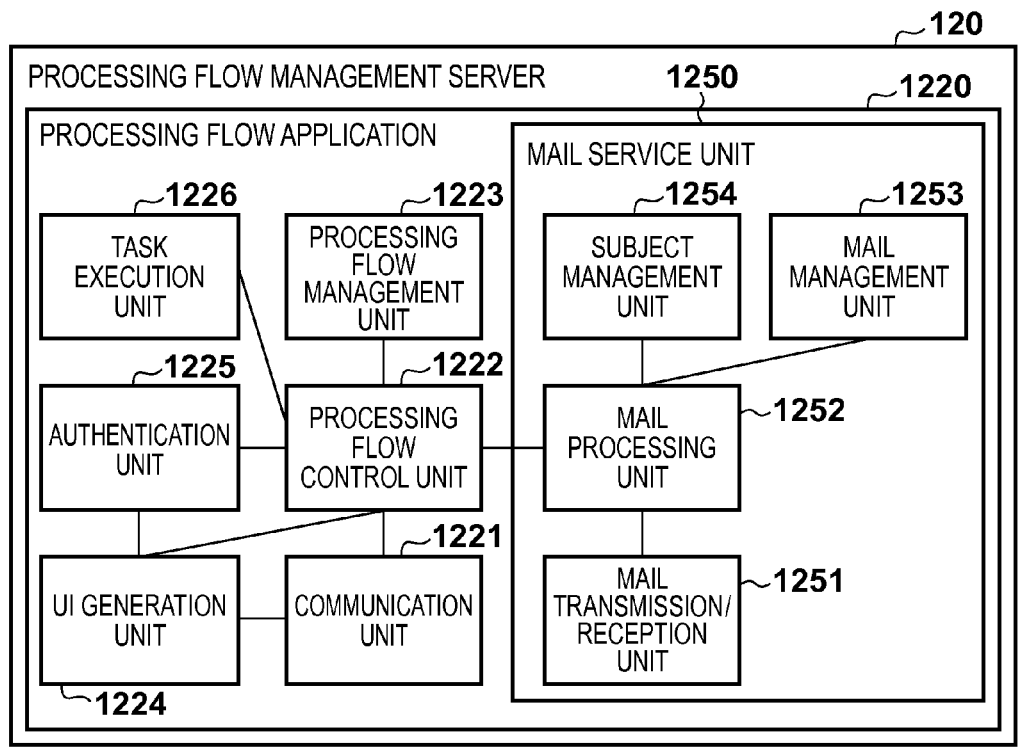
FIGS. 12A and 12B are diagrams showing a software configuration of a processing flow management server 120.

Regarding the software configuration of the processing flow management server 120, only portions that are different from those in Embodiment 1 will be described below. FIG. 12A is a diagram showing an example of a configuration of software modules for causing the processing flow management server 120 to function as the processing units of a processing flow application 1220. A program stored in the HDD 306 included in the processing flow management server 120 is executed by the CPU of the processing flow management server 120 and thereby causes the processing flow management server 120 to function as the processing units of the processing flow application 1220.

The processing flow management server 120 includes the processing flow application 1220. The processing flow application 1220 includes a communication unit 1221, a processing flow control unit 1222, a processing flow management unit 1223, a UI generation unit 1224, an authentication unit 1225, a task execution unit 1226, and a mail service unit 1250. Note that in the present embodiment, the processing flow application 1220 includes the mail service unit 1250, but the mail service unit 1250 may be configured as a separate application as well. Also, a configuration is possible in which the mail service unit 1250 is arranged on a separate server that is independent of the processing flow management server 120.

The communication unit 1221, the processing flow control unit 1222, and the processing flow management unit 1223 are the same as the communication unit 421, the processing flow control unit 422, and the processing flow management unit 423 respectively in Embodiment 1. Also, the UI generation unit 1224, the authentication unit 1225, and the task execution unit 1226 are the same as the UI generation unit 424, the authentication unit 425, and the task execution unit 426 respectively in Embodiment 1.

The mail service unit 1250 includes a mail reception/transmission unit 1251, a mail processing unit 1252, a mail management unit 1253, and a subject management unit 1254. The mail reception/transmission unit 1251, the mail processing unit 1252, and the mail management unit 1253 are the same as the mail transmission/receiving unit 451, the mail processing unit 452, and the mail management unit 453 respectively in Embodiment 1.

The subject management unit 1254 is a software module that manages a subject management table 1270. The subject management table 1270 will be described later in detail with reference to FIG. 12B. The subject management unit 1254 receives an issuing instruction from the mail processing unit 1252, issues a subject linked to the processing flow, and registers the subject in the subject management table 1270. Also, the subject management unit 1254 receives a deletion request from the mail processing unit 1252 and deletes a mail address from the subject management table 1270.

FIG. 12B is an example of a subject management table managed by the subject management unit 1254. Although a description will be given using a table format schematically in the present embodiment, a CSV format or a text file in XML or the like may be used as well.

The subject management table 1270 includes columns 1271 to 1274. One record indicates one piece of subject data. Column 1271 shows subjects issued by the subject management unit 1254. Column 1272 shows processing flow IDs linked to subjects. For example, in the case of the first record of the subject management table 1270, the processing flow ID is "75301938", and it is linked with the processing flow of the first record of the processing flow management table 500.

Column 1273 shows days and times on which processing flows were requested from the MFP 110. In the present embodiment, a mail address is issued when a definition file for a processing flow is requested from the MFP 110, although this will be described in detail later. The day and time of the request is registered in this column. Column 1274 shows whether or not the link between the subject and the processing flow is valid. If it is set to "true", the link with the processing flow is valid. If it is set to "false", the link with the processing flow is invalid.

Creation of Processing Flow

Regarding the creation of a processing flow, only portions that are different from Embodiment 1 will be described here. The sequence up to the creation of the processing flow is the same as that in Embodiment 1. Also, the screen for creating the processing flow is the same as that in FIG. 6. The definition file for the created processing flow differs from that in Embodiment 1.

FIG. 13 shows a definition file for a processing flow that is to be created after the button 610 is pressed by the user on the processing flow creation screen in FIG. 6. Also, the processing flow definition file is stored in column 504 in the processing flow management table 500. A processing flow definition file 1300 is substantially the same as the processing flow definition file 700, and therefore only the portions that are different will be described below.

Tag 1301 is a "ReplyTo" tag that shows the reply destination of the e-mail. If this tag is included, the processing flow execution application 400 of the MFP 110 sets the e-mail address declared in this tag in the "Reply-To" header in the e-mail when the e-mail is to be transmitted. The e-mail address "flowservice@flowservice.bcd.com" is set in tag 1301.

The processing flow application 1220 statically stores this e-mail address and when an e-mail addressed to this e-mail address is received, start executing the processing flow. Note that in Embodiment 1, the "Reply-To" tag has not been included at the point in time of creating the processing flow.

Execution of Processing Flow by MFP 110

Regarding the processing for the MFP 110 to execute the processing flow, only portions that are different from Embodiment 1 will be described below. The processing sequence up to receiving the instruction to access the processing flow application is the same.

FIG. 14 shows a sequence of processing for the MFP 110, the processing flow management server 120, and the PC 130 in the case where the processing flow is to be executed by the MFP 110. The processing from step S1401 to step S1406 is the same as that in steps S801 to S806 in FIG. 8 shown in Embodiment 1.

In step S1407, the processing flow application 1220 sets the subject in the processing flow. The details of this processing will be described with reference to FIG. 15. FIG. 15 is a flowchart for the processing flow application 1220 showing an example of processing in step S1407.

The processing of steps S1501 and S1502 is the same as that in steps S901 and S902 in FIG. 9 shown in Embodiment 1. In step S1503, the processing flow control unit 1222 transmits a request via the mail processing unit 1252 to the subject management unit 1254 to issue a subject linked to the processing flow. At that time, the processing flow control unit 1222 transfers the target processing flow ID. The subject management unit 1254 issues a subject in accordance with the request from the processing flow control unit 1222. Then, the subject management unit 1254 registers the issued subject, the processing flow ID received from the processing flow control unit 1222, the current day and time, and the setting indicating that the subject is valid ("true") in the columns of the subject management table 1270. Then, the subject management unit 1254 transfers the issued subject to the processing flow control unit 1222 via the mail processing unit 1252.

In step S1504, the processing flow control unit 1222 adds the subject received in step S1503 to the processing flow definition file 1300 as the setting for the "Subject" of the e-mail, and the procedure transitions to step S1505. The processing of step S1505 is the same as that of step S905 in FIG. 9.

FIG. 16 is an example of a processing flow definition file after the flowchart shown in FIG. 15 has been processed. Note that a processing flow definition file 1600 shown in FIG. 16 is the processing flow definition file 1300 shown in FIG. 13 after having undergone processing. Because of this, only the differences therebetween will be described here.

Tag 1601 is a "Subject" tag that shows the subject of the e-mail. If tag 1601 is included, the processing flow execution application 400 of the MFP 110 sets the subject declared in tag 1601 to be the "Subject" header of the e-mail when the e-mail is to be transmitted. The subject in tag 1601 is "dha9apcgap1hv". This is the subject in the first record of the subject management table 1270 shown in FIG. 12B.

The description will now return to FIG. 14. In step S1408, the processing flow control unit 1222 transmits the processing flow definition file (e.g. FIG. 16) after the flowchart shown in FIG. 15 has been processed to the MFP 110. The processing flow execution application 400 of the MFP 110 receives the processing flow definition file via the communication unit 401. The processing of steps S1409 and S1410 is the same as that in steps S809 and S810 shown in FIG. 8 of Embodiment 1.

In step S1411, the processing flow control unit 1222 instructs the task execution unit 1226 to execute an e-mail transmission task using the settings defined in the processing flow. The task execution unit 1226 executes the e-mail transmission using the settings listed in the processing flow. In actuality, the task execution unit 1226 transmits the e-mail to an e-mail server (not shown). Then, an e-mail client operating in the PC 130 receives the e-mail from the e-mail server due to a user instruction, and thereby the e-mail is stored in the PC 130. Note that, as described above, if the "ReplyTo" tag is included in the processing flow, the task execution unit 1226 sets the e-mail address declared in the "ReplyTo" tag in the "Reply-To" header in the e-mail. Furthermore, the task execution unit 1226 sets the value of the "Subject" tag (tag 1601) included in the processing flow definition file in the "Subject" header of the e-mail. The processing of step S1412 is the same as that of step S812 in FIG. 8.

E-Mail Reply

Regarding the processing of the e-mail reply in Embodiment 2, only portions that are different from Embodiment 1 will be described here. The processing for replying with an e-mail in the PC 130 is the same as that in Embodiment 1. The processing after the processing flow application 1220 receives the e-mail is different from that in Embodiment 1.

Figure 17:
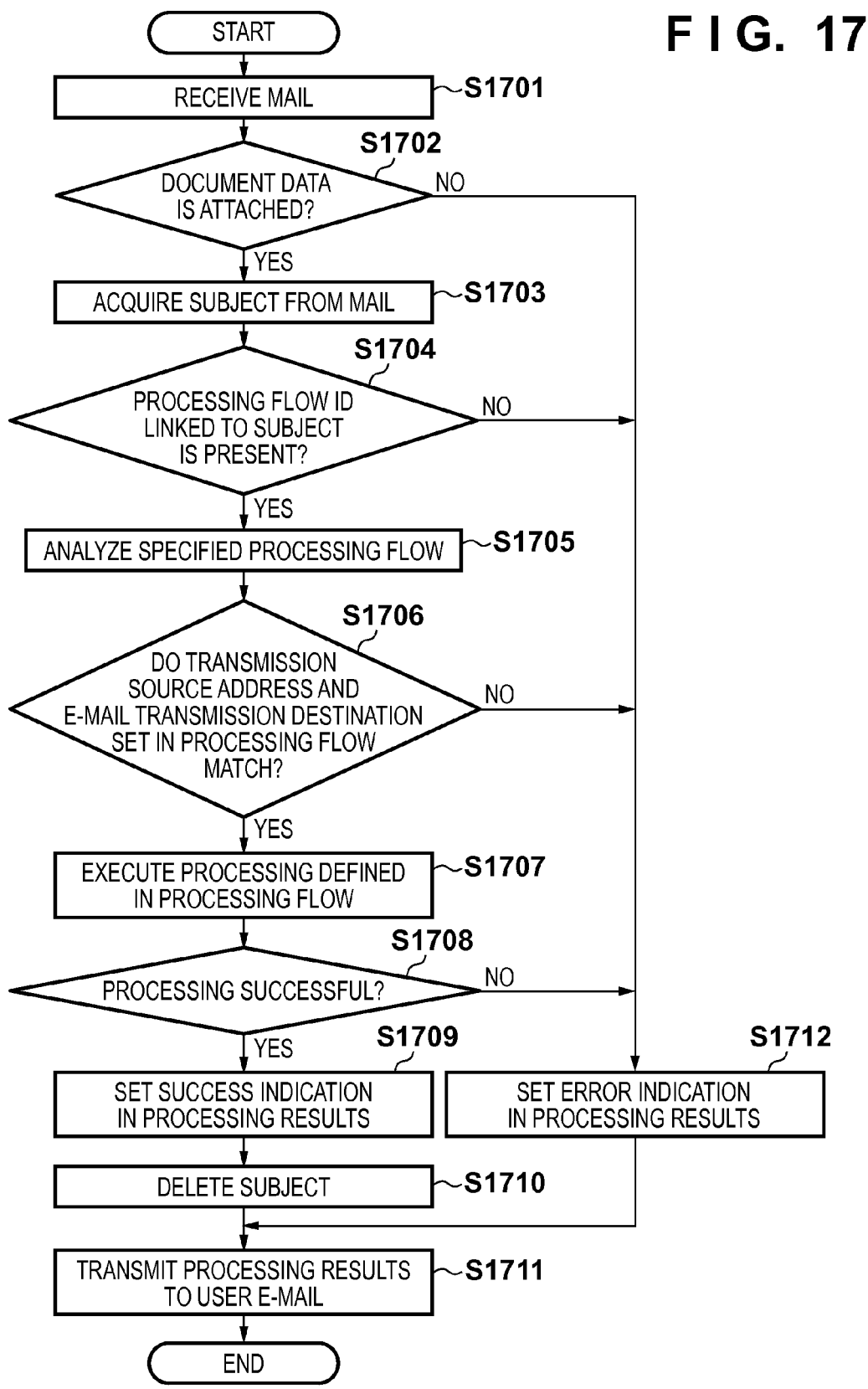
FIG. 17 is a diagram showing an example of a flowchart for receiving an e-mail.

FIG. 17 is a flowchart for the processing flow application 1220 showing an example of processing at the time of receiving the e-mail. The processing of steps S1701 and S1702 is the same as that in steps S1101 and S1102 in FIG. 11 described in Embodiment 1.

In step S1703, the processing flow control unit 1222 transmits a request via the mail processing unit 1252 to the mail management unit 1253 to acquire the document data and the subject attached to the e-mail. The mail management unit 1253 acquires the attached document data and the subject from the stored e-mail and transfers them to the mail management unit 1253 via the mail processing unit 1252.

In step S1704, the processing flow control unit 1222 transfers the subject to the subject management unit 1254 via the mail processing unit 1252 and transmits a request to specify the processing flow. The subject management unit 1254 specifies the processing flow ID based on the received subject. Specifically, the subject management unit 1254 compares column 1271 of the subject management table 1270 with the subject. Note that the subject management unit 1254 deletes unnecessary characters included in the subject before the comparison. For example, a case is conceivable in which "Re:" is attached to the e-mail subject when an e-mail reply has been performed. The subject management unit 1254 deletes character strings such as that and subsequently performs the comparison. Note that the method of comparison is not limited to this, and the comparison may be performed by a begins-with match, an ends-with match, or the like.

As a result of the comparison, if there is no matching record (NO in step S1704), the procedure transitions to step S1712. If there is a matching record, the subject management unit 1254 checks the availability in column 1274 of the record. If column 1274 is "false", the procedure transitions to step S1712. If column 1274 is "true", the subject management unit 1254 acquires the processing flow ID in column 1272. At this time, the subject management unit 1254 sets the availability in column 1274 to "false" and the procedure transitions to step S1705. By operating column 1274 in this way, when the processing of steps S1705 to S1709 is being executed, the processing flow is not executed redundantly even in the case where an e-mail is transmitted with the same subject.

The processing of steps S1705 to S1709 is the same as that in steps S1105 to S1109 in FIG. 11. In step S1710, the processing flow control unit 1222 transmits a request via the mail processing unit 1252 to the subject management unit 1254 to delete the subject linked to the processing flow whose execution is complete. The subject management unit 1254 deletes the record of the subject whose deletion was requested from the subject management table 1270, and the procedure transitions to step S1711. By deleting the issued subject in this way, it is possible to prevent the processing flow from being executed redundantly.

The processing of step S1711 is the same as the processing of step S1111 in FIG. 11. In step S1712, the processing flow control unit 1222 sets an indication of an error in the processing results. Note that at this time, a URL for validating the link between the subject that was invalidated ("false" in column 1274) in step S1704 and the processing flow may be set. Accordingly, after resolving the cause of the error, the user can execute the processing flow once more. Also, a URL or the like for deleting the issued subject may be set. Accordingly, a subject that is not needed can be deleted from the subject management table.

As described above, according to the present embodiment, one e-mail address for executing a processing flow is stored permanently and set as the reply destination of the e-mail. Also, a subject is issued and set to be the subject of the e-mail for each processing flow. Accordingly, since the desired processing is executed by a user merely replying with an e-mail, user operations are simplified in a processing flow in which a user operation is needed partway through.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-001292, filed Jan. 8, 2013, which is hereby incorporated by reference herein in its entirety.

What is claimed is:

1. A system comprising:
an information processing apparatus that manages a processing flow including a plurality of tasks; and
an image processing apparatus that executes at least one of the tasks included in the processing flow,
wherein the information processing apparatus comprises:
  a first memory; and
  a first processor in communication with the first memory and configured to:
    issue an e-mail address in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;
    manage the issued e-mail address associated with the requested processing flow;
    set the issued e-mail address into the e-mail-transmission task included in the requested processing flow;
    transmit the requested processing flow to the image processing apparatus after the issued e-mail address is set into the e-mail-transmission task included in the requested processing flow;
    receive a first transmission destination e-mail address of the first e-mail from the image processing apparatus when the image processing apparatus transmits the first e-mail to the first transmission destination e-mail address, wherein the information processing apparatus manages the received first transmission destination e-mail address;
    receive a second e-mail returned from a user terminal based on a "Reply-To" setting of the first e-mail, the second e-mail including a second attached document operated by the user terminal, wherein a second transmission destination e-mail address of the second e-mail is the issued e-mail address included as the "Reply-To" setting;
    determine whether a transmission source e-mail address of the second e-mail matches with the first transmission destination e-mail address of the first e-mail; and
    continue execution of the processing flow corresponding to the second transmission destination e-mail address of the second e-mail for the second attached document included in the second e-mail when the transmission source e-mail address of the second e-mail matches with the first transmission destination e-mail address of the first e-mail,
    wherein the execution of the processing flow corresponding to the second transmission destination e-mail address of the second e-mail for the second attached document included in the second e-mail is cancelled when the transmission source e-mail address of the second e-mail does not match with the first transmission destination e-mail address of the first e-mail, and
wherein the image processing apparatus comprises:
  a second memory; and
  a second processor in communication with the second memory and configured to:
    receive the requested processing flow from the information processing apparatus;
    transmit the first e-mail with the first attached document to the first transmission destination e-mail address, wherein the transmitted first e-mail includes, as the "Reply-To" setting, the issued e-mail address set in the e-mail-transmission task included in the requested processing flow; and
    transmit the first transmission destination e-mail address of the first e-mail to the information processing apparatus.

2. The system according to claim 1, wherein:
the first processor is further configured to authenticate the transmission source e-mail address of the second e-mail using an electronic signature, and the execution of the processing flow corresponding to the second transmission destination e-mail address of the second e-mail is continued when the transmission source e-mail address of the second e-mail matches with the first transmission destination e-mail address of the first e-mail and if the electronic signature is valid.

3. The system according to claim 1, wherein the first processor is further configured to transmit the result of executing the processing flow to the transmission source e-mail address of the second e-mail when the execution of the processing flow is complete.

4. The system according to claim 1, wherein the first processor transmits, to the image processing apparatus, the e-mail-transmission task to be executed by the image processing apparatus among the plurality of tasks included in the processing flow.

5. A system comprising:
an information processing apparatus that manages a processing flow including a plurality of tasks; and
an image processing apparatus that executes at least one of the tasks included in the processing flow,
wherein the information processing apparatus comprises:
a first memory; and
a first processor in communication with the first memory and configured to:
issue an e-mail subject in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;
manage the issued e-mail subject associated with the requested processing flow;
set the issued e-mail subject into the e-mail-transmission task included in the requested processing flow;
transmit the requested processing flow to the image processing apparatus after the issued e-mail subject is set into the e-mail-transmission task included in the requested processing flow;
receive a first transmission destination e-mail address of the first e-mail from the image processing apparatus when the image processing apparatus transmits the first e-mail to the first transmission destination e-mail address, wherein the information processing apparatus manages the received first transmission destination e-mail address;
receive a second e-mail returned from a user terminal, the second e-mail including a second attached document operated by the user terminal, wherein a second e-mail subject of the second e-mail includes the issued e-mail subject of the first e-mail;
determine whether a transmission source e-mail address of the second e-mail matches with the first transmission destination e-mail address of the first e-mail; and
continue execution of the processing flow corresponding to the second e-mail subject of the second e-mail for the second attached document included in the second e-mail when the transmission source e-mail address of the second e-mail matches with the first transmission destination e-mail address of the first e-mail, wherein the execution of the processing flow corresponding to the second e-mail subject of the second e-mail for the second attached document included in the second e-mail is cancelled when the transmission source e-mail address of the second e-mail does not match with the first transmission destination e-mail address of the first e-mail, and
wherein the image processing apparatus comprises:
a second memory; and
a second processor in communication with the second memory and configured to:
receive the requested processing flow transmitted from the information processing apparatus;
transmit the first e-mail with the first attached document to the first transmission destination e-mail address, wherein the transmitted first e-mail includes, as a subject of the e-mail, the issued e-mail subject set in the e-mail-transmission task included in the requested processing flow; and
transmit the first transmission destination e-mail address of the first e-mail to the information processing apparatus.

6. An information processing apparatus, for managing a processing flow including a plurality of tasks, connected to an image processing apparatus, the information processing apparatus comprising:
a first memory; and
a first processor in communication with the first memory and configured to:
issue an e-mail address in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;
manage the issued e-mail address associated with the requested processing flow;
set the issued e-mail address into the e-mail-transmission task included in the requested processing flow;
transmit the requested processing flow to the image processing apparatus after the issued e-mail address is set into the e-mail-transmission task included in the requested processing flow;
receive a first transmission destination e-mail address of the first e-mail from the image processing apparatus when the image processing apparatus transmits the first e-mail to the first transmission destination e-mail address, wherein the information processing apparatus manages the received first transmission destination e-mail address;
receive a second e-mail returned from a user terminal based on a "Reply-To" setting of the first e-mail, the second e-mail including a second attached document operated by the user terminal, wherein a second transmission destination e-mail address of the second e-mail is the issued e-mail address included as the "Reply-To" setting;
determine whether a transmission source e-mail address of the second e-mail matches with the first transmission destination e-mail address of the first e-mail; and
continue execution of the processing flow corresponding to the second transmission destination e-mail address of the second e-mail for the second attached document included in the second e-mail when the transmission source e-mail address of the second e-mail matches with the first transmission destination e-mail address of the first e-mail, wherein the execution of the processing flow corresponding to the second transmission destination e-mail address of the second e-mail for the second attached document included in the second e-mail is cancelled when the transmission source e-mail address of the second e-mail does not match with the first transmission destination e-mail address of the first e-mail, and wherein the image processing apparatus comprises:
a second memory; and
a second processor in communication with the second memory and configured to:
receive the requested processing flow from the information processing apparatus;
transmit the first e-mail with the first attached document to the first transmission destination e-mail address, wherein the transmitted first e-mail includes, as the "Reply-To" setting, the issued e-mail address set in the e-mail-transmission task included in the requested processing flow; and
transmit the first transmission destination e-mail address of the first e-mail to the information processing apparatus.

7. An information processing apparatus, for managing a processing flow including a plurality of tasks, connected to an image processing apparatus, the information processing apparatus comprising:
a first memory; and
a first processor in communication with the first memory and configured to:
issue an e-mail subject in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;
manage the issued e-mail subject associated with the requested processing flow;
set the issued e-mail subject into the e-mail-transmission task included in the requested processing flow;
transmit the requested processing flow to the image processing apparatus after the issued e-mail subject is set into the e-mail-transmission task included in the requested processing flow;
receive a first transmission destination e-mail address of the first e-mail from the image processing apparatus when the image processing apparatus transmits the first e-mail to the first transmission destination e-mail address, wherein the information processing apparatus manages the received first transmission destination e-mail address;
receive a second e-mail returned from a user terminal, the second e-mail including a second attached document operated by the user terminal, wherein a second e-mail subject of the second e-mail includes the issued e-mail subject of the first e-mail;
determine whether a transmission source e-mail address of the second e-mail matches with the first transmission destination e-mail address of the first e-mail; and continue execution of the processing flow corresponding to the second e-mail subject of the second e-mail for the second attached document included in the second e-mail when the transmission source e-mail address of the second e-mail matches with the first transmission destination e-mail address of the first e-mail, wherein the execution of the processing flow corresponding to the second e-mail subject of the second e-mail for the second attached document included in the second e-mail is cancelled when the transmission source e-mail address of the second e-mail does not match with the first transmission destination e-mail address of the first e-mail, and wherein the image processing apparatus comprises:
a second memory; and
a second processor in communication with the second memory and configured to:
receive the requested processing flow transmitted from the information processing apparatus;
transmit the first e-mail with the first attached document to the first transmission destination e-mail address, wherein the transmitted first e-mail includes, as a subject of the e-mail, the issued e-mail subject set in the e-mail-transmission task included in the requested processing flow; and
transmit the first transmission destination e-mail address of the first e-mail to the information processing apparatus.

8. A method of controlling a system comprising:
an information processing apparatus having a first memory and a first processor in communication with the first memory, and that manages a processing flow including a plurality of tasks; and
an image processing apparatus having a second memory and a second processor in communication with the second memory, and that executes at least one of the tasks included in the processing flow,
wherein the method is executable by the first processor and comprises the steps of:
issuing an e-mail address in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;
managing the issued e-mail address associated with the requested processing flow;
setting the issued e-mail address into the e-mail-transmission task included in the requested processing flow;
transmitting the requested processing flow to the image processing apparatus after the issued e-mail address is set into the e-mail-transmission task included in the requested processing flow;
receiving a first transmission destination e-mail address of the first e-mail from the image processing apparatus when the image processing apparatus transmits the first e-mail to the first transmission destination e-mail address, wherein the information processing apparatus manages the received first transmission destination e-mail address;
receiving a second e-mail returned from a user terminal based on a "Reply-To" setting of the first e-mail, the second e-mail including a second attached document operated by the user terminal, wherein a second transmission destination e-mail address of the second e-mail is the issued e-mail address included as the "Reply-To" setting;

determining whether a transmission source e-mail address of the second e-mail matches with the first transmission destination e-mail address of the first e-mail; and continuing execution of the processing flow corresponding to the second transmission destination e-mail address of the second e-mail for the second attached document included in the second e-mail when the transmission source e-mail address of the second e-mail matches with the first transmission destination e-mail address of the first e-mail, wherein the execution of the processing flow corresponding to the second transmission destination e-mail address of the second e-mail for the second attached document included in the second e-mail is cancelled when the transmission source e-mail address of the second e-mail does not match with the first transmission destination e-mail address of the first e-mail, and wherein the method is executable by the second processor and comprises the steps of:

receiving the requested processing flow from the information processing apparatus;

transmitting the first e-mail with the first attached document to the first transmission destination e-mail address, wherein the transmitted first e-mail includes, as the "Reply-To" setting, the issued e-mail address set in the e-mail-transmission task included in the requested processing flow; and transmitting the first transmission destination e-mail address of the first e-mail to the information processing apparatus.

9. A method of controlling a system comprising:

an information processing apparatus having a first memory and a first processor in communication with the first memory, and that manages a processing flow including a plurality of tasks; and an image processing apparatus having a second memory and a second processor in communication with the second memory, and that executes at least one of the tasks included in the processing flow, wherein the method is executable by the first processor and comprises the steps of:

issuing an e-mail subject in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;

managing the issued e-mail subject associated with the requested processing flow;

setting the issued e-mail subject into the e-mail-transmission task included in the requested processing flow;

transmitting the requested processing flow to the image processing apparatus after the issued e-mail subject is set into the e-mail-transmission task included in the requested processing flow;

receiving a first transmission destination e-mail address of the first e-mail from the image processing apparatus when the image processing apparatus transmits the first e-mail to the first transmission destination e-mail address, wherein the information processing apparatus manages the received first transmission destination e-mail address;

receiving a second e-mail returned from a user terminal, the second e-mail including a second attached document operated by the user terminal, wherein a second e-mail subject of the second e-mail includes the issued e-mail subject of the first e-mail;

determining whether a transmission source e-mail address of the second e-mail matches with the first transmission destination e-mail address of the first e-mail; and continuing execution of the processing flow corresponding to the second e-mail subject of the second e-mail for the second attached document included in the second e-mail when the transmission source e-mail address of the second e-mail matches with the first transmission destination e-mail address of the first e-mail, wherein the execution of the processing flow corresponding to the second e-mail subject of the second e-mail for the second attached document included in the second e-mail is cancelled when the transmission source e-mail address of the second e-mail does not match with the first transmission destination e-mail address of the first e-mail, and wherein the method is executable by the second processor and comprises the steps of:

receiving the requested processing flow transmitted from the information processing apparatus;

transmitting the first e-mail with the first attached document to the first transmission destination e-mail address, wherein the transmitted first e-mail includes, as a subject of the e-mail, the issued e-mail subject set in the e-mail-transmission task included in the requested processing flow; and transmitting the first transmission destination e-mail address of the first e-mail to the information processing apparatus.

10. A non-transitory computer-readable medium storing a program for executing a method of controlling a system comprising:

an information processing apparatus having a first processor, and that manages a processing flow including a plurality of tasks; and an image processing apparatus having a second processor that at least one of the tasks included in the processing flow, wherein the method is executable by the first processor and comprises the steps of:

issuing an e-mail address in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;

managing the issued e-mail address associated with the requested processing flow;

setting the issued e-mail address into the e-mail-transmission task included in the requested processing flow;

transmitting the requested processing flow to the image processing apparatus after the issued e-mail address is set into the e-mail-transmission task included in the requested processing flow;

receiving a first transmission destination e-mail address of the first e-mail from the image processing apparatus when the image processing apparatus transmits the first e-mail to the first transmission destination e-mail address, wherein the information processing apparatus manages the received first transmission destination e-mail address;

receiving a second e-mail returned from a user terminal based on a "Reply-To" setting of the first e-mail, the second e-mail including a second attached document operated by the user terminal, wherein a second transmission destination e-mail address of the second e-mail is the issued e-mail address included as the "Reply-To" setting;

determining whether a transmission source e-mail address of the second e-mail matches with the first transmission destination e-mail address of the first e-mail; and continuing execution of the processing flow corresponding to the second transmission destination e-mail address of the second e-mail for the second attached document included in the second e-mail when the transmission source e-mail address of the second e-mail matches with the first transmission destination e-mail address of the first e-mail, wherein the execution of the processing flow corresponding to the second transmission destination e-mail address of the second e-mail for the second attached document included in the second e-mail is cancelled when the transmission source e-mail address of the second e-mail does not match with the first transmission destination e-mail address of the first e-mail, and wherein the method is executable by the second processor and comprises the steps of:

receiving the requested processing flow from the information processing apparatus;

transmitting the first e-mail with the first attached document to the first transmission destination e-mail address, wherein the transmitted first e-mail includes, as the "Reply-To" setting, the issued e-mail address set in the e-mail-transmission task included in the requested processing flow; and transmitting the first transmission destination e-mail address of the first e-mail to the information processing apparatus.

11. A non-transitory computer-readable medium storing a program for executing a method of controlling a system comprising:

an information processing apparatus having a first processor, and that manages a processing flow including a plurality of tasks; and an image processing apparatus having a second processor that at least one of the tasks included in the processing flow, wherein the method is executable by the first processor and comprises the steps of:

issuing an e-mail subject in association with the processing flow requested from the image processing apparatus when the requested processing flow includes an e-mail-transmission task that causes the image processing apparatus to transmit a first e-mail with a first attached document, wherein the first attached document is document data to be processed in the requested processing flow;

managing the issued e-mail subject associated with the requested processing flow;

setting the issued e-mail subject into the e-mail-transmission task included in the requested processing flow;

transmitting the requested processing flow to the image processing apparatus after the issued e-mail subject is set into the e-mail-transmission task included in the requested processing flow;

receiving a first transmission destination e-mail address of the first e-mail from the image processing apparatus when the image processing apparatus transmits the first e-mail to the first transmission destination e-mail address, wherein the information processing apparatus manages the received first transmission destination e-mail address;

receiving a second e-mail returned from a user terminal, the second e-mail including a second attached document operated by the user terminal, wherein a second e-mail subject of the second e-mail includes the issued e-mail subject of the first e-mail;

determining whether a transmission source e-mail address of the second e-mail matches with the first transmission destination e-mail address of the first e-mail; and continuing execution of the processing flow corresponding to the second e-mail subject of the second e-mail for the second attached document included in the second e-mail when the transmission source e-mail address of the second e-mail matches with the first transmission destination e-mail address of the first e-mail, wherein the execution of the processing flow corresponding to the second e-mail subject of the second e-mail for the second attached document included in the second e-mail is cancelled when the transmission source e-mail address of the second e-mail does not match with the first transmission destination e-mail address of the first e-mail, and wherein the method is executable by the second processor and comprises the steps of:

receiving the requested processing flow transmitted from the information processing apparatus;

transmitting the first e-mail with the first attached document to the first transmission destination e-mail address, wherein the transmitted first e-mail includes, as a subject of the e-mail, the issued e-mail subject set in the e-mail-transmission task included in the requested processing flow; and transmitting the first transmission destination e-mail address of the first e-mail to the information processing apparatus.

* * * * *